United States Patent [19]

Betts et al.

[11] Patent Number: 5,251,273
[45] Date of Patent: Oct. 5, 1993

[54] DATA PROCESSING SYSTEM AND METHOD FOR SEQUENTIALLY REPAIRING CHARACTER RECOGNITION ERRORS FOR SCANNED IMAGES OF DOCUMENT FORMS

[75] Inventors: Timothy S. Betts, Germantown; Valerie M. Carras, Kensington; Lewis B. Knecht, Olney, all of Md.; Gerald B. Anderson, Scarborough, Canada; Thomas L. Paulson, Potomac, Md.

[73] Assignee: International Business Machines Corporation, Armonk, N.Y.

[21] Appl. No.: 870,129

[22] Filed: Apr. 15, 1992

[51] Int. Cl.⁵ .............................................. G06K 9/00
[52] U.S. Cl. ...................................... 382/57; 382/61; 283/74
[58] Field of Search .............. 382/57, 61, 7; 283/74; 235/463, 379; 358/448

[56] References Cited

U.S. PATENT DOCUMENTS

| | | | |
|---|---|---|---|
| 4,136,395 | 1/1979 | Kolpek et al. | 382/57 |
| 4,503,556 | 3/1985 | Scherl et al. | 382/9 |
| 4,533,959 | 8/1985 | Sakurai | 358/280 |
| 4,564,752 | 1/1986 | Lepic et al. | 382/57 |
| 4,616,854 | 10/1986 | Landrum et al. | 283/74 |
| 4,741,045 | 4/1988 | Denning | 382/9 |
| 4,748,678 | 5/1988 | Takeda et al. | 382/56 |
| 4,802,231 | 1/1989 | Davis | 382/57 |
| 4,813,077 | 3/1989 | Woods et al. | 382/7 |
| 4,933,979 | 6/1990 | Suzuki et al. | 382/61 |
| 4,933,984 | 6/1990 | Nakano et al. | 382/61 |
| 4,949,392 | 8/1990 | Barski et al. | 382/61 |
| 4,992,650 | 2/1991 | Somerville | 235/463 |
| 5,010,580 | 4/1991 | Vincent et al. | 382/17 |
| 5,040,227 | 8/1991 | Lyke et al. | 382/57 |
| 5,054,096 | 10/1991 | Belzer | 382/61 |
| 5,058,185 | 10/1991 | Morris et al. | 382/57 |
| 5,134,669 | 7/1992 | Keogh et al. | 382/61 |
| 5,140,650 | 8/1992 | Casey et al. | 382/61 |

OTHER PUBLICATIONS

R. G. Casey, et al. entitled "Intelligent Forms Processing," *IBM Systems Journal*, vol. 29, No. 3, 1990, pp. 435-450.

*Primary Examiner*—Joseph Mancuso
*Assistant Examiner*—Yon J. Gonso
*Attorney, Agent, or Firm*—John E. Hoel

[57] ABSTRACT

A data processing system uses a machine-generated data structure (MGDS) to dynamically record and use the character recognition and repair histories of category fields on a document form. The MGDS includes a field data segment which has a coded data buffer portion and an error buffer portion for the extracted field image. Recognition coded data is entered into the coded data buffer portion and recognition error data is entered into the error buffer portion of the field data segment. Then subsequent repair processes can be applied to the recognition coded data by augmenting the MGDS with a repair segment for each character string which is repaired. A sequence of repair stages can be applied to a particular character string, each repair step adding another repair segment to the MGDS. At each stage of repair, the best estimate of the character string is placed into the coded data buffer portion of the field data segment. This enables the best estimate of the information content of the document field to be readily available for each stage of repair and for ultimate use in the data processing system.

10 Claims, 33 Drawing Sheets

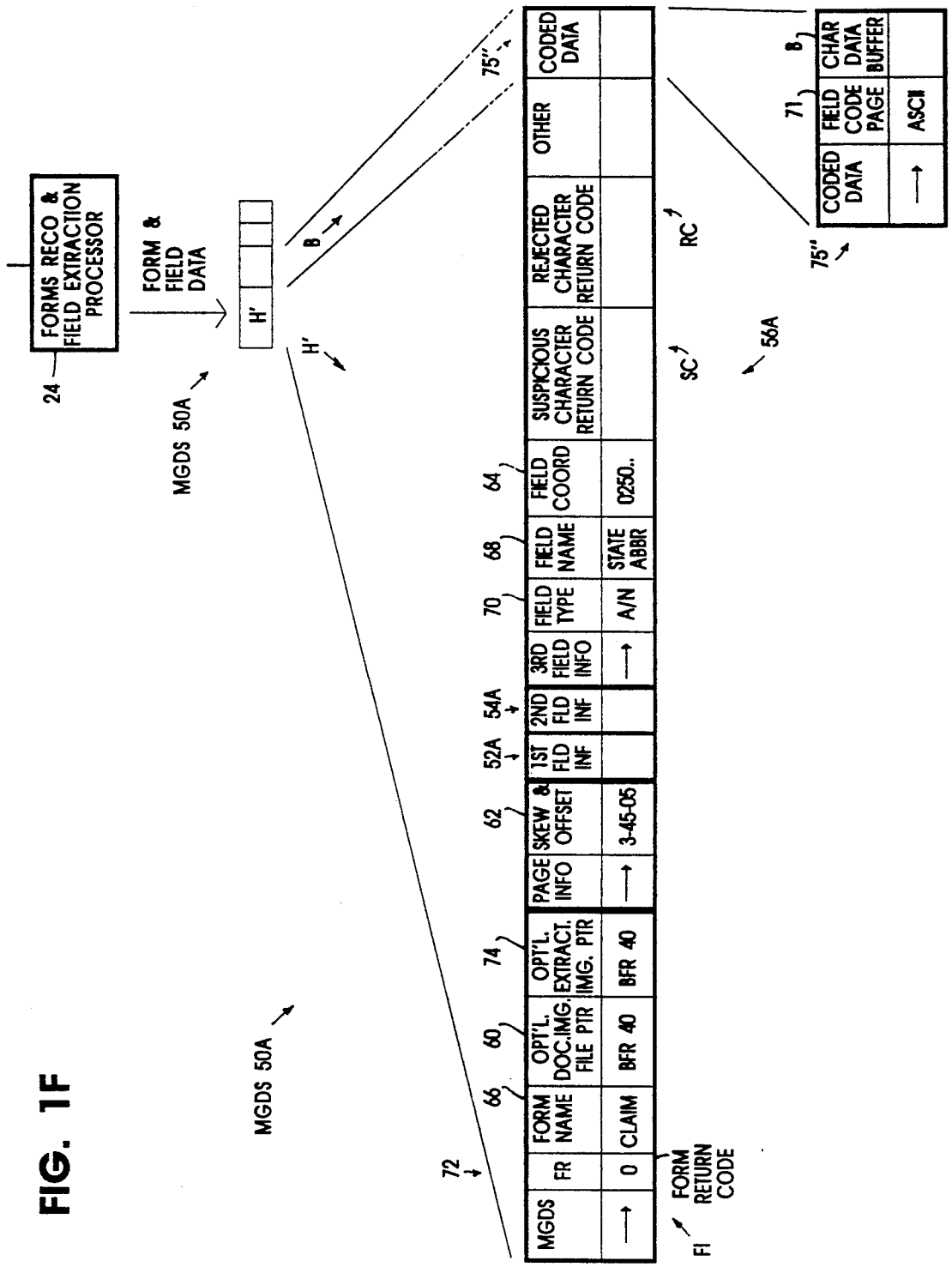

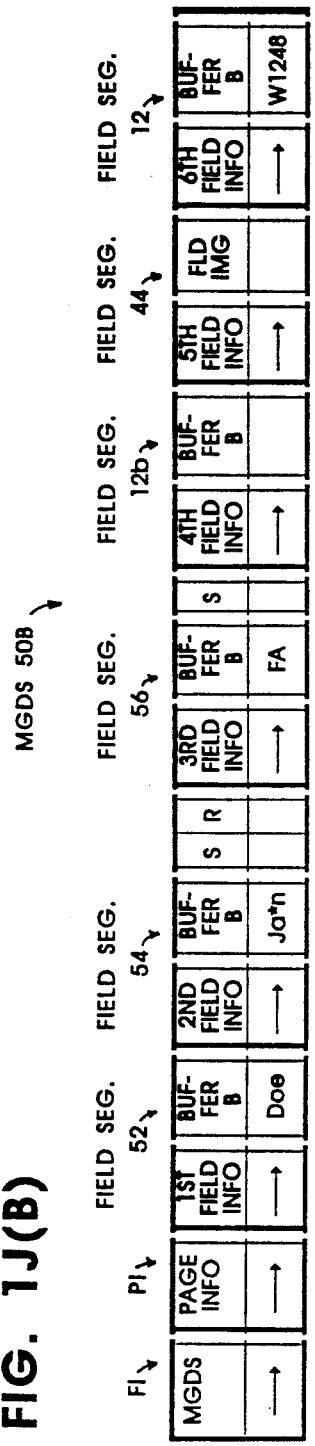
FIG. 1J(B)
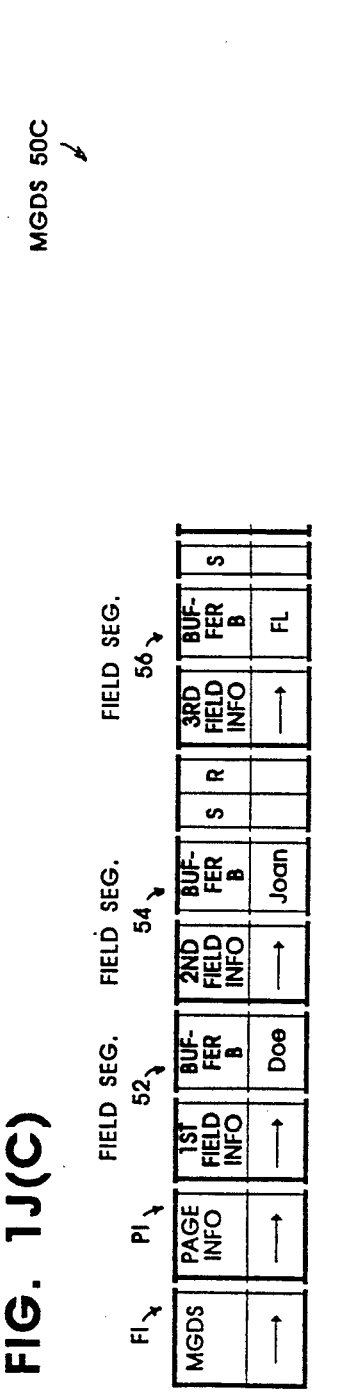
FIG. 1J(C)
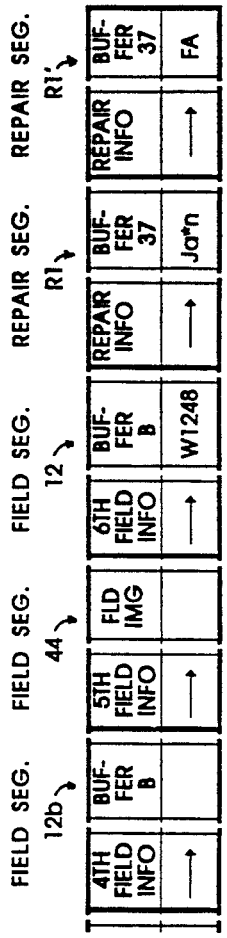

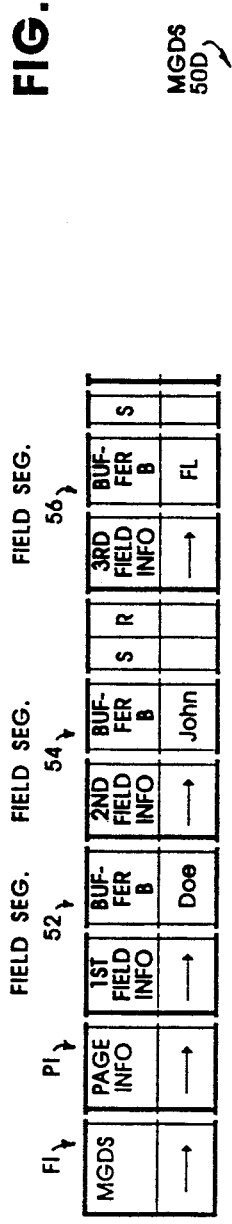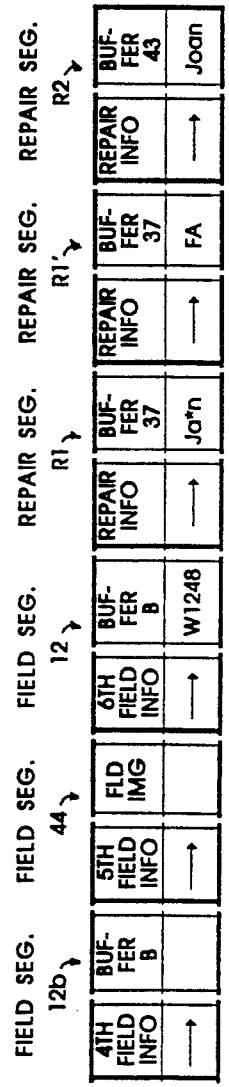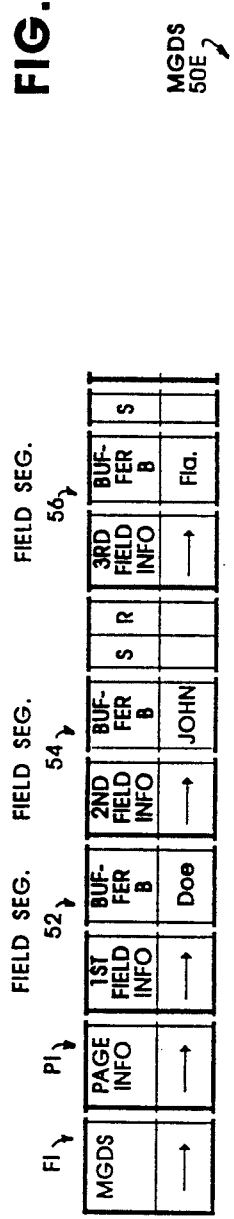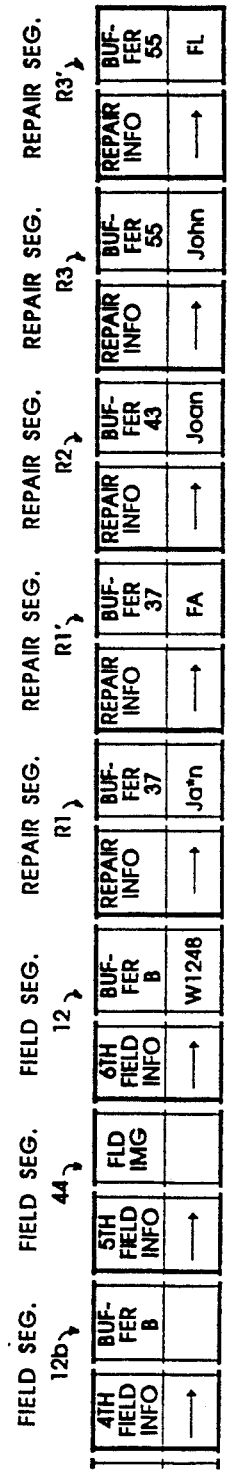
FIG. 1J(D)
FIG. 1J(E)

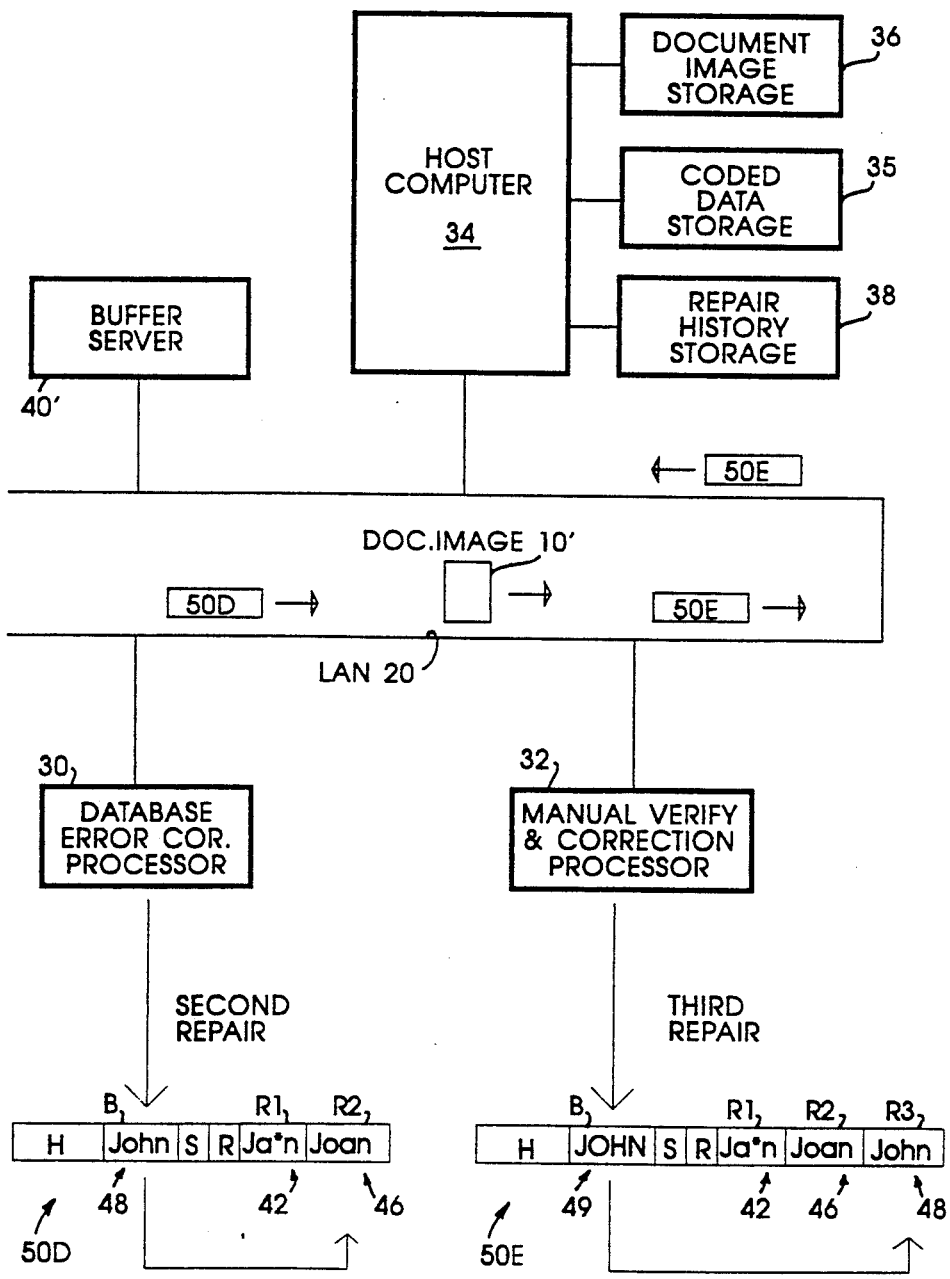

FIG. 2A

MASTER FORM 10F

FIELD: FORM NUMBER

FIELD: SERIAL NUMBER

11F

↙12F

FIELD: LAST NAME

14F

13

Insurance
Claim Form

FIELD: FIRST NAME

16F

17

FIELD: STATE

12aF

FIELD: ADDRESS

12bF

FIELD: SIGNATURE

44F

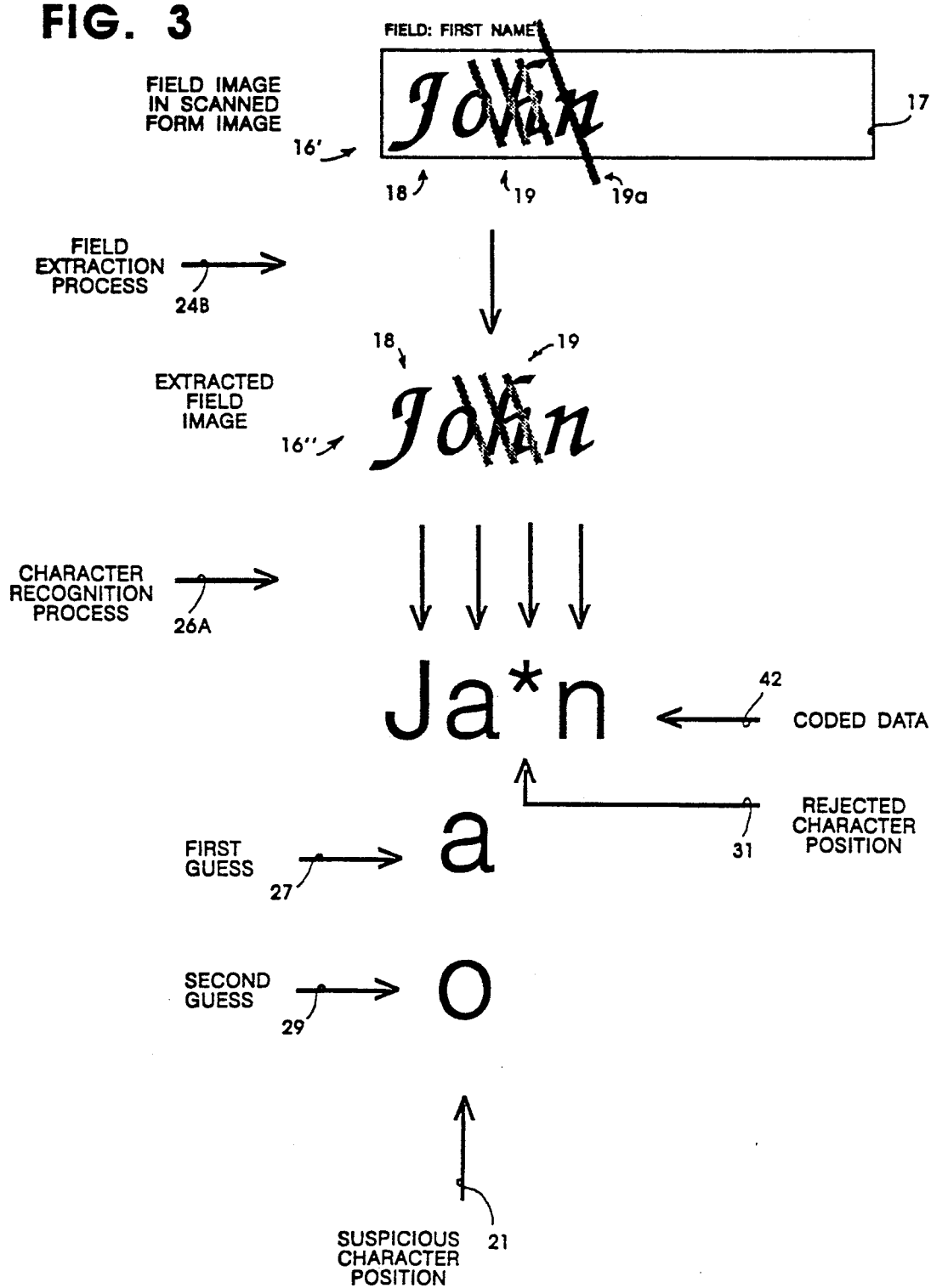

FORMS RECOGNITION PROCESS 24A AND FIELD EXTRACTION PROCESS 24B

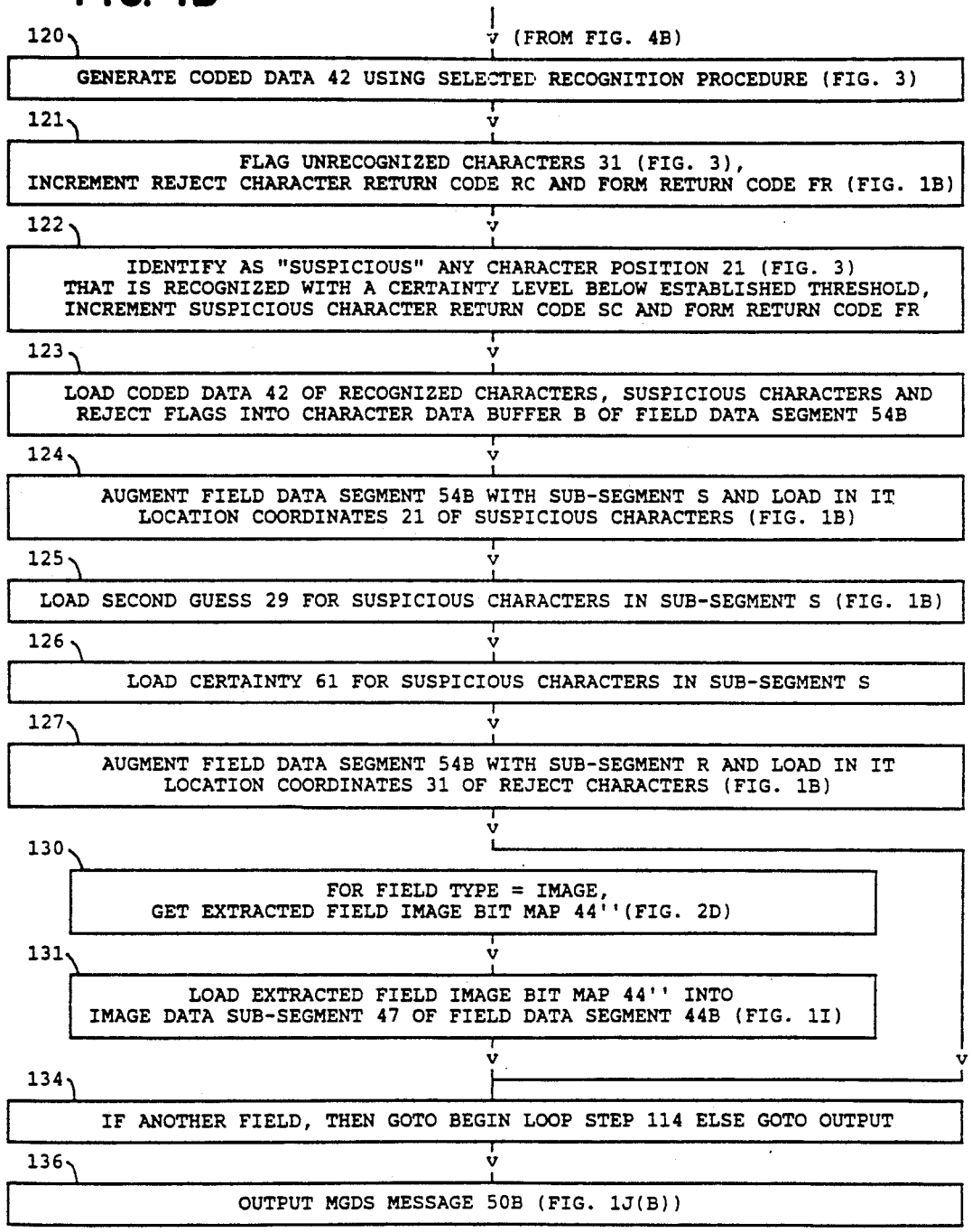

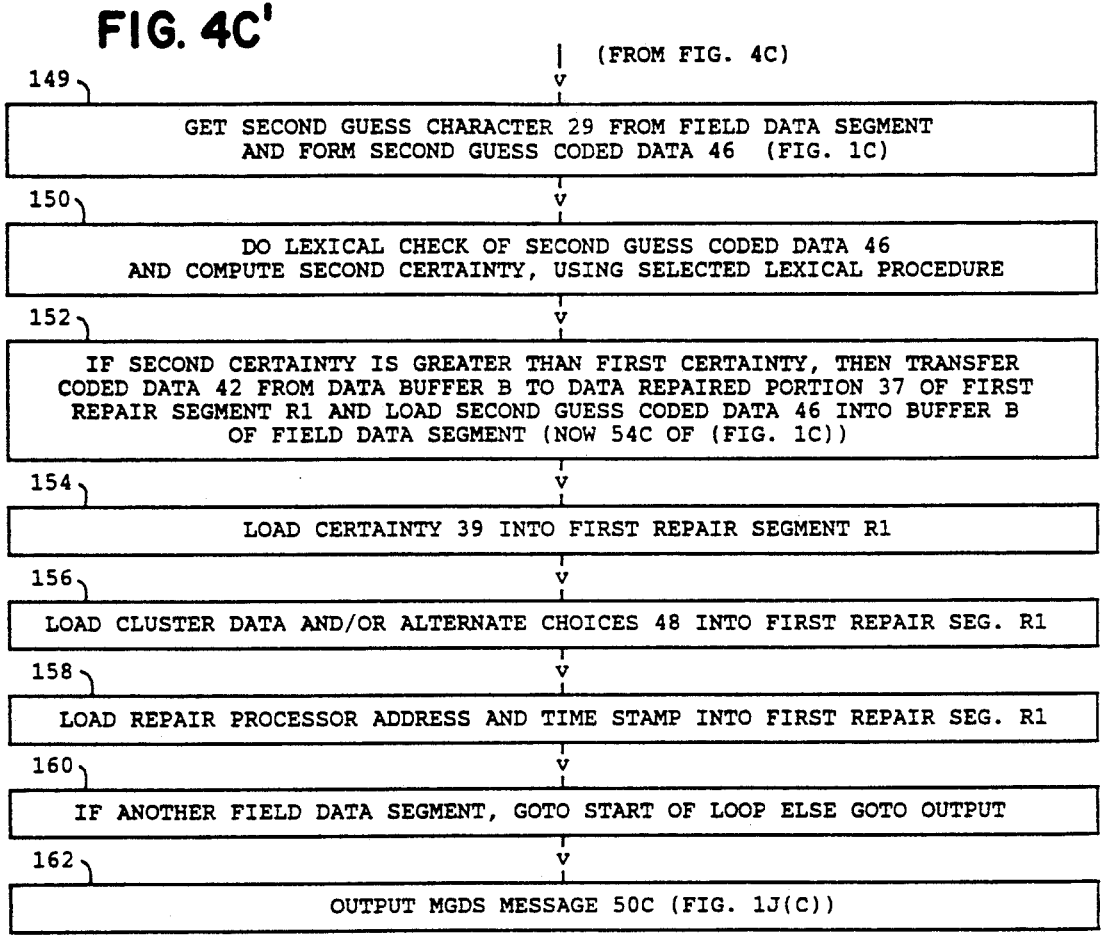

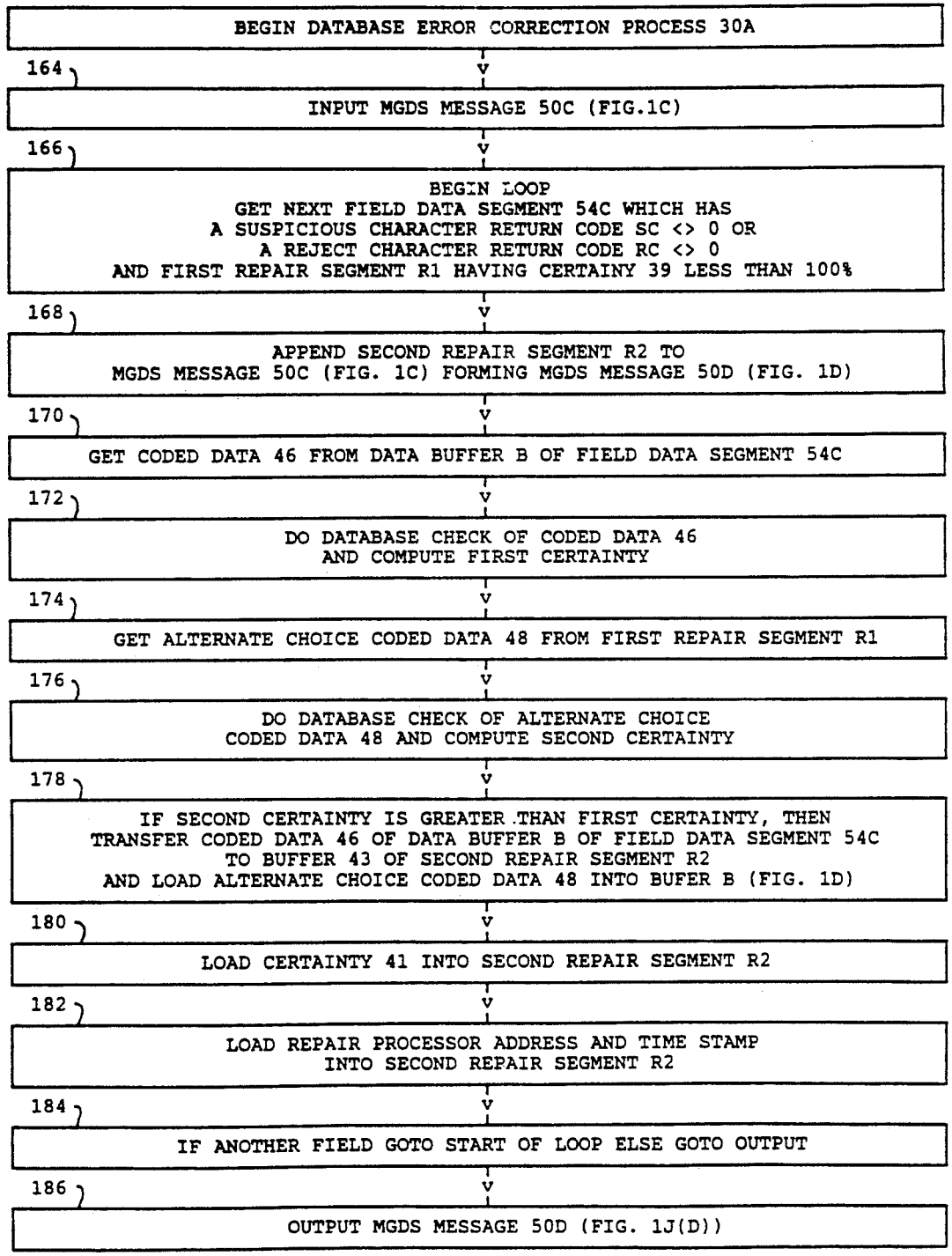

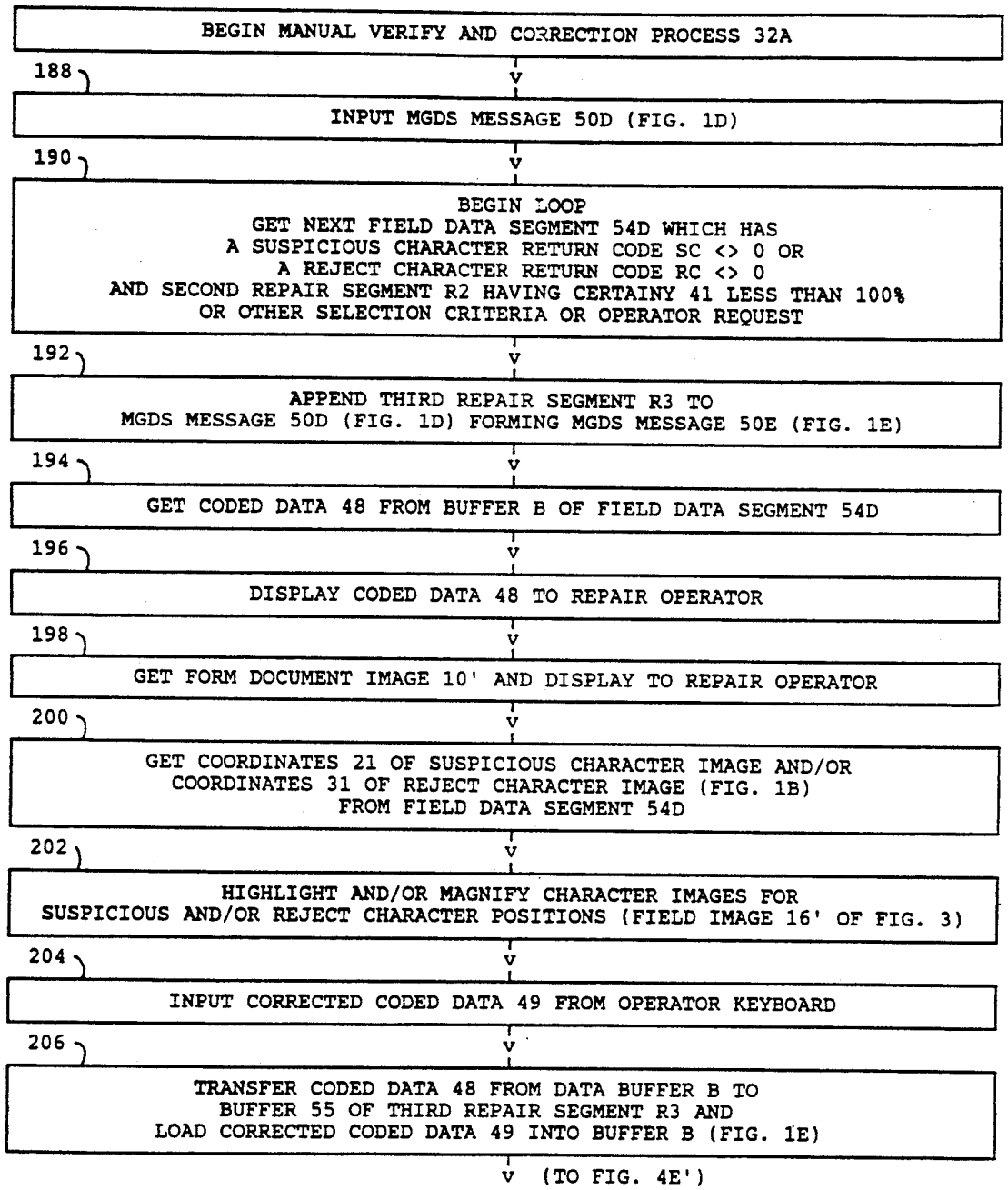

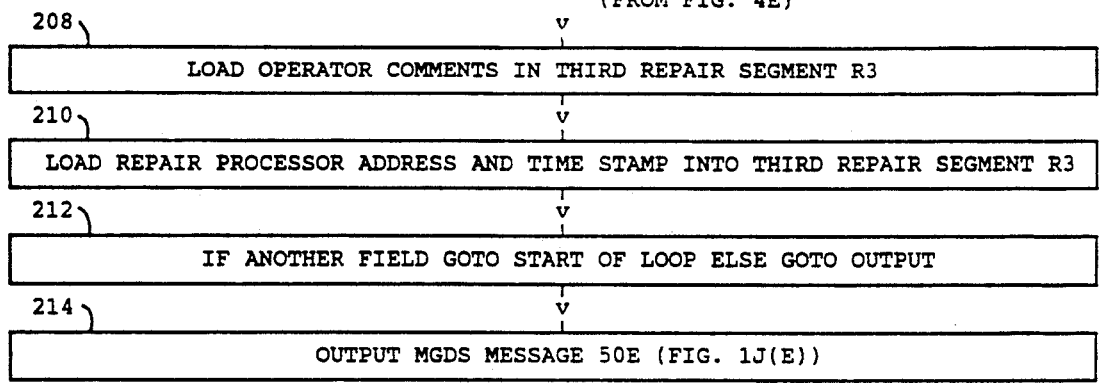

FIG. 6

| MGDS | MGDS Version | Form Return Code | When To Convert | Form Class Name | Form Name | General Codepage | Unreco. Character Flag | Number of Fields | Host Codepage |
|---|---|---|---|---|---|---|---|---|---|

| Host Form Codepage | Page Information | Page Return Code | Page Number | Page Resolution | Page Orientation | Field Info. | Coded Data | Field Codepage |
|---|---|---|---|---|---|---|---|---|

| Character Data | Coded Data | Field Codepage | Character Data | Coded Data | Field Codepage | Character Data | Field Assoc. | Field Name |
|---|---|---|---|---|---|---|---|---|

| Field Form Page | Rejected Character Return Code | Suspicious Character Return Code | Field Coords | Field Type | Field Info. | Coded Data | Field Codepage |
|---|---|---|---|---|---|---|---|

| Character Data | Coded Data | Field Codepage | Character Data | Coded Data | Field Codepage | Character Data | Field Assoc. | Field Name |
|---|---|---|---|---|---|---|---|---|

| Field Form Page | Rejected Character Return Code | Suspicious Character Return Code | Field Coordinates | Field Type | Reject Character Information | Character Coordinates |
|---|---|---|---|---|---|---|

| Character Position | Reject Character Information | Character Coordinates | Character Position |
|---|---|---|---|

FIG. 7A

Form Information

| MGDS | | | MGDS Version | | | Form Return Code | | | When To Convert | | |
|---|---|---|---|---|---|---|---|---|---|---|---|
| Length | ID | Data | Length | ID | Data | Length | ID | Data | Length | ID | Data |
| ???? | 1100 | → | 0006 | 1121 | 0001 | 0006 | 1101 | 0000 | 0005 | 112B | 00 |

| Form Class Name | | | Form Name | | | General Code Page | | | Unrecoed Char. Flag | | |
|---|---|---|---|---|---|---|---|---|---|---|---|
| Length | ID | Data | Length | ID | Data | Length | ID | Data | Length | ID | Data |
| 000A | 1102 | FClass | 0009 | 1103 | FType | 0006 | 1122 | 0352 | 0005 | 1104 | * |

| Number of Fields | | | Form Code Page | | | Host Form Code Page | | |
|---|---|---|---|---|---|---|---|---|
| Length | ID | Data | Length | ID | Data | Length | ID | Data |
| 0006 | 1105 | 0003 | 0006 | 1106 | 0352 | 0006 | 112C | 01F4 |

| Host Code Page | | | Page Information | | | Page Information | | |
|---|---|---|---|---|---|---|---|---|
| Length | ID | Data | Length | ID | Data | Length | ID | Data |
| 0006 | 1111 | 01F4 | ???? | 1127 | → | ???? | 1127 | → |

| Field Information | | | Field Information | | | Field Information | | |
|---|---|---|---|---|---|---|---|---|
| Length | ID | Data | Length | ID | Data | Length | ID | Data |
| ???? | 1107 | → | ???? | 1107 | → | ???? | 1107 | → |

FIG. 7B
Page Information

| Page Information | | | Page Number | | | Page Resolution | | | Page Orientation | | |
|---|---|---|---|---|---|---|---|---|---|---|---|
| Length | ID | Data | Length | ID | Data | Length | ID | Data | Length | ID | Data |
| 0016 | 1127 | → | 0006 | 1128 | 0001 | 0006 | 1126 | 012C | 0006 | 111D | 0001 |

FIG. 7C
Field Information

| Field Information | | | Rejected Char. RC | | | Suspicious Char RC | | | Field Association | | | |
|---|---|---|---|---|---|---|---|---|---|---|---|---|
| Length | ID | Data | Length | ID | Data | Length | ID | Data | Length | ID | Data | ... |
| ???? | 1107 | → | 0006 | 110D | 0000 | 0006 | 110B | 0000 | 0006 | 1109 | AUTO | ... |

| Field Name | | | Field Form Page | | | Field Coordinates | | | |
|---|---|---|---|---|---|---|---|---|---|
| Length | ID | Data | Length | ID | Data | Length | ID | Data | |
| 000A | 110E | Unit # | 0006 | 1128 | 0001 | 0014 | 110C | 00000064000000320000012C000000C8 | ... |

| Coded Data | | | Reject Char. Info | | | Reject Char. Info | | | |
|---|---|---|---|---|---|---|---|---|---|
| Length | ID | Data | Length | ID | Data | Length | ID | Data | |
| ???? | 1112 | → | 0016 | 110F | → | 0016 | 110F | → | ... |

FIG. 7D

Coded Data Information

| Coded Data | | | Field Code Page | | | Character Buffer | | |
|---|---|---|---|---|---|---|---|---|
| Length | ID | Data | Length | ID | Data | Length | ID | Data |
| 0012 | 1112 | → | 0006 | 1113 | 01F4 | 000B | 1108 | John |

FIG. 7E

Reject Information

| Reject Char. Info | | | Character Coordinates | | | Character Position | | |
|---|---|---|---|---|---|---|---|---|
| Length | ID | Data | Length | ID | Data | Length | ID | Data |
| 001E | 110F | → | 0014 | 1114 | 000002600000000300000026A000000D8 | 0006 | 1115 | 0005 |

DATA PROCESSING SYSTEM AND METHOD FOR SEQUENTIALLY REPAIRING CHARACTER RECOGNITION ERRORS FOR SCANNED IMAGES OF DOCUMENT FORMS

BACKGROUND OF THE INVENTION

1. Technical Field

The invention disclosed broadly relates to data processing systems and methods and more particularly relates to techniques for the repair of character recognition information derived from scanned document images.

2. Background Art

Data processing systems and methods have been devised to capture the image of hard copy documents for display, communication and archiving. The process of capturing the image of a document starts with scanning the hard copy document in front of an image scanning device which converts the black and white or, gray level or color object shapes into corresponding picture elements represented by a bit map array. The bit map array can be selectively compressed to remove redundancy through techniques such as run length encoding The compressed image file can then be efficiently transmitted over data communications links and stored in conventional data storage devices However, the information content of the bit map for the image is not in the coded data format which can be manipulated for arithmetic and word processing applications. The conversion of the shapes of characters in a document image must be done by a character recognition step.

Character recognition makes use of pattern recognition processes to convert the shapes of images representing characters in the bit mapped image, into character codes such as the ASCII alphanumeric character code. Character recognition outputs character strings which can be used to generate addresses for the storage or transmission of the document image, this process being referred to as auto indexing. Character recognition can also be used to provide character strings to program applications, derived from the hard copy documents scanned into the system.

An example of a document image archiving system can be found in U.S. Pat. No. 5,058,185 to Morris, et al. entitled "Object Management and Delivery System Having Multiple Object Resolution Capability," which is assigned to the IBM Corporation and incorporated herein by reference.

The process of locating meaningful portions of the document image which contain information useful to auto indexing or to application programs is made easier by the use of hard copy forms. A hard copy form will provide a pre-defined location for the specification of words and phrases representing categories of information meaningful to both auto indexing and application programs. For example, a hard copy form can have the identity of the form in a pre-specified location, to enable the system to quickly access a master form definition to identify the location of other meaningful character images in the document image. Other fields can be pre-specified in the master form definition to locate other meaningful categories containing character images for character recognition. The master form definition can also include a specification of the code page for characters expected to be represented in particular fields on the form.

A problem which occurs in the character recognition of information fields on the image of a document form is the appearance of extraneous marks and misaligned images on the form. A technique to overcome problems of extraneous marks and misregistration or misalignment of images on a form document is described in the co-pending U.S. patent application Ser. No. 07/305,828, filed Feb. 2, 1989, now U.S. Pat. No. 5,140,650, by R. G. Casey and D. R. Ferguson entitled "A Computer Implemented Method for Automatic Extraction of Data From Printed Forms," assigned to the IBM Corporation and incorporated herein by reference.

As described by Casey and Ferguson, a blank master form can be scanned into the system and its digital image stored. Each type of form which is to be recognized must first be defined to the system. That master form definition can include a fingerprint of the master form's image which will be used to confirm the correctness of the form and to verify that the entire incoming form was completely scanned. Also as a part of the master form definition, a bar code may be included which is associated with the form or other numeric or identifying information can be included to identify the form. In addition, the coordinates of all defined fields are provided for the form in the master form definition.

The image of the hard copy document form which has been scanned into the system is examined and its features are compared with the master form definition. The line geography of the scanned image is compared with a definition of the line geography for the master form. This is a test of whether the horizontal or vertical line specified for each interior node in the master form definition, exists on the scanned image of the input document form. Alternately, a bar code may be associated with each form that has been defined in the master form definition data set. If a bar code is to be employed to identify the form, then scanning can proceed from one side of the document image to the other and bar code information identified. When the bar code is found, it will be used to determine the identity of the form. Once the identity of the form has been determined, the master form definition for that particular form type can be accessed to determine the location of all of the fields within the form image. Alternately, the identity of the form can also be input by the user from the keyboard or other input device, enabling access of the intended form definition. Reference can also be made to the publication by R. G. Casey and D. R. Ferguson, "Intelligent Forms Processing," *IBM Systems Journal*, Vol. 29, No. 3, 1990, pp. 435–450, for additional details on the process of form recognition.

After a form has been recognized for its form type and its corresponding master form definition has been accessed, the coordinates of each of the fields for which character recognition is to be applied are now available. Now that the coordinates of each respective field are available for character recognition, a clean image of each character string must be lifted from the overall document image. Typically, the document fields will have extraneous marks or misregistered or misaligned character strings and the effects these defects must be eliminated or reduced. This is accomplished by the step of field extraction. Once the form is identified and verified, data from the form's fields must be extracted. This begins with identifying any image skew and offset. The master coordinates for the fields on the form must be adjusted to compensate for the skew and the offset of the incoming form image. Next, field adjustment must be performed. The boundaries of each field must be checked to determine if data extends beyond the boundaries. If data overlaps the field boundaries, the area of image lift must be extended outside of the field boundary. Next, extraneous line removal must be accomplished. When extraneous lines are identified, those lines must be removed from the field image without damaging the character images within the field. The process of field extraction is described in more detail in the above referenced co-pending U. S. patent application by Casey and Ferguson and is also described in the above referenced technical article by Casey and Ferguson.

After the field image has been extracted from the overall document image of the form, a character recognition must be performed to convert the shapes in the extracted field image into alphanumeric character representations such as ASCII. The master form definition will include information on the code page which characterizes the characters expected to be present in each respective field on the form. For single byte character sets, SBCS, such as in Latin languages, the code page will be specified. For double byte character sets, DBCS, languages such as Kanji character, Mandarin, or other oriental characters, the appropriate code page will be specified in the master form definition data set.

The process of character recognition takes bi-level images and performs pattern recognition operations, returning ASCII-coded data representing the recognized characters. Unrecognized characters are flagged and their location in the character string is identified. Suspicious characters are marked as being any character that is recognized with a certainty level that is below the established certainty for properly recognized characters. Further information on the character recognition process can be found in the above referenced co-pending U. S. patent application by Casey and Ferguson and also in the above referenced technical article by Casey and Ferguson.

The recognition of the images of a bar code representing the form identity in the scanned document image, can be better understood with reference to the U.S. Pat. No. 4,992,650 by Somerville entitled "Method and Apparatus for Bar Code Recognition in a Digital Image," assigned to the IBM Corporation and incorporated herein by reference.

A problem in the prior art of accurate character recognition of character strings in scanned document images, is the need to repair misrecognized character strings. Typically, techniques for repairing misrecognized character strings will depend upon the type of information expected for a particular character string and the code page representation expected for that information. For example, if numeric information is expected to be placed in a particular field, then the character recognition operation can be limited to recognizing Arabic characters and no consideration need be given to Latin character shapes. For example, if a poorly represented numeral "4" occurred in a field identified as a numeric field, then no attempt would be made by the recognition operation to interpret the shape as a "P." Alternately, if a field is identified by the master form definition as being a given name field, for example, then character strings in that field can be verified by comparing with a lexicon of conventional given names. Similarly, if a particular field is defined in the master form definition as being for the name of a state, then the lexicon for conventional state names can be used to compare and validate poorly recognized character strings in that field. Alternately, if Kanji character information is to be represented in a particular field as defined by the master field definition, then a still different form of comparison and validation should be used for that field.

Since the types of unrecognized character repair processes are diverse and depend upon the field type, among other determinants, a diversity of processes may be required to handle the repair of misrecognized fields occurring on the same document form. Some mechanism is needed to keep track of the history of repair and the requirements for repair of particular fields which have been misrecognized on a document form image.

Another problem is maintaining an audit trail of the repair history for particular fields which have been misrecognized on a document form. For example, if an application makes use of a particular field to index the document image in an image archiving system, and if the character repair for misrecognized characters in the field is defective, the archived image will be misfiled in the system. If this were a medical record, for example, and if the misfiling of this document image resulted in significant liability to the user, such as an insurance company, some means should be available to trace the repair history of that field.

Still further, where an attempt is made to improve the repair processing for misrecognized character strings, the accessibility of the repair histories for previously processed fields would be useful in assessing the effectiveness of new techniques for character repair.

Still further, where sequential stages of character repair require information from a prior stage of character repair in order to perform the subsequent repair stage, some means is needed to track the history for the repair of the misrecognized and suspicious characters in the field.

OBJECTS OF THE INVENTION

It is therefore an object of the invention to provide an improved technique for character recognition of information on document form images.

It is another object of the invention to provide an improved technique for misrecognized characters in fields on forms scanned into a document imaging and archiving system.

It is still a further object of the invention to provide an improved technique for tracking the history of repair of misrecognized character strings for document form images.

It is still a further object of the invention to provide an improved technique for coordinating the sequential repair of misrecognized character strings in document form images.

It is still a further object of the invention to provide an improved technique for auditing the repair history of misrecognized character strings in document form images.

SUMMARY OF THE INVENTION

These and other objects, features and advantages are accomplished by the invention disclosed herein. The digital image of a document represents the information content of the document in spatial form. If a portion of that information content is required for use as an operand in a data processor, then a character recognition process must be applied to the digital image in order to convert it into an alphanumeric representation of the information.

The initial stage of a character recognition process typically matches shape characteristics of input document character images with previously stored, standardized shape characteristics. This initial stage produces first trial alphanumeric strings with characters in at least three classes of certainty: (1) recognized characters whose identity is substantially 100% certain, (2) suspicious characters whose identity is significantly less than 100% certain and (3) rejected characters whose identity is significantly less than 50% certain. For suspicious characters, many initial stage recognition processes will also output a second guess character having the next highest certainty.

To enhance the level of certainty in the recognition process, a second stage can be used to repair the first trial alphanumeric strings output with suspicious or rejected characters. This can be done by applying tests which are selected, based on the category of information which the string represents. This requires that the field in the document image from which the trial string was extracted, is a field dedicated to the category. Thus, second stage repair processes are most readily applied to document forms having fields dedicated to pre-specified categories of information, such as name, address, city, state, etc.

For example, if the first trial string represents a two letter state abbreviation, then the number of candidate character pairs is approximately 50 and the level of certainty for the identity of the string can be increased by identifying the state abbreviation which most closely matches the first trial string. This can be referred to as the second trial string. If a second guess character has been provided by the initial stage process, then an alternate first trial string can also be analyzed in the second stage and an alternate state abbreviation can be identified which most closely matches it. This can be referred to as the alternate second trial string. It can be seen that there can be many different types of second stage repair processes, as many types as there are possible field categories on the document form.

To further enhance the level of certainty in the recognition process, a third stage can be used to repair the second trial string and the alternate second trial string. Where the string extracted from a particular category field of the document is intended for use in a data processing application having the valid form of the string as one of a limited number of such strings in a data base, then an application data base search can be performed on both the second trial string and the alternate second trial string to determine which one is represented in the application data base. It can be seen that there can be many different types of third stage repair processes, as many types as there are possible subject categories in the application data base.

It can be seen that in order to perform second stage and third stage repair of a trial string from a single category field on the document form, accurate records must be maintained of the repairs carried out at each stage, including second guess characters and alternate trial strings. However, document forms typically contain ten or twenty category fields on a page and many forms have multiple pages. For such documents, the problem of of maintaining a history of the repairs for each category over many stages of repair, becomes significant.

At each stage of repair, the best estimate of the information content of the document field should be readily available for the next stage of repair or for use.

At each stage of repair, the best alternate trial strings and second guess characters should be readily available for each category field for the next stage of repair.

To maximize the performance of the recognition process, the level of certainty for the trial string resulting from the previous repair stages, should be readily available for the next stage of repair. This would enable subsequent attempts at further repair to be avoided for particular fields when the current certainty level is high.

And, when all else fails and an audit must be made of the overall recognition process, the history of repair for each category field should be readily available.

This is achieved by providing a data processing system, method and computer program for generating, augmenting and using a machine generated data structure (MGDS) to dynamically record and use the character recognition repair histories of category fields on a document form.

The invention is a data processing system for repairing character recognition errors for digital images of document forms. It includes an intelligent forms processor, for inputting a digital document image of a document form and extracting a field image from the document image, forming a corresponding extracted field image.

The intelligent forms processor then generates recognition coded data from the extracted field image and generates recognition error data using a character recognition process.

In accordance with the invention, the intelligent forms processor assembles a machine generated data structure (MGDS) which includes a field data segment including a coded data buffer portion and an error buffer portion for the extracted field image.

Then, the intelligent forms processor inserts the recognition coded data into the coded data buffer portion and it inserts the recognition error data into the error buffer portion of the field data segment.

The intelligent forms processor may then perform a second stage repair process using the MGDS, or alternately it can send the MGDS to another repair processor.

A first coded data repair processor can be coupled to the intelligent forms processor, for receiving the MGDS and repairing the recognition coded data.

In accordance with the invention, the first coded data repair processor augments the MGDS with a first repair segment which includes a first repair data buffer portion.

The first coded data repair processor accesses the recognition coded data from the coded data buffer portion and accesses the recognition error data from the error buffer portion of the field data segment and generates first repaired coded data using the first repair process.

Then, in accordance with the invention, the first coded data repair processor inserts the first repaired coded data into the coded data buffer portion of the field data segment and inserts the recognition coded data into the first repair data buffer portion of the first repair segment. In this manner, the best available version of the information in the extracted field image is kept in the coded data buffer portion of the field data segment.

If a utilization processor is coupled to the first coded data repair processor and receives the MGDS, it can access the contents of the coded data buffer portion of the field data segment for use as a corrected form of the recognition coded data.

Alternately a second coded data repair processor can be coupled to the first coded data processor, for receiving the MGDS and repairing the first repaired coded data.

In accordance with the invention, the second coded data repair processor augments the MGDS with a second repair segment which includes a second repair data buffer portion.

The second coded data repair processor accesses the first repaired coded data from the coded data buffer portion of the field data segment and generates second repaired coded data using the second repair process.

Then, in accordance with the invention, the second coded data repair processor inserts the second repaired coded data into the coded data buffer portion of the field data segment and inserts the first repaired coded data into the second repair data buffer portion of the second repair segment. In this manner, the best available version of the information in the extracted field image is kept in the coded data buffer portion of the field data segment.

Alternately a workstation can be coupled to the first coded data repair processor, for receiving the MGDS and repairing the first repaired coded data.

In accordance with the invention, the workstation augments the MGDS with a second repair segment which includes a second repair data buffer portion.

The workstation then accesses the first repaired coded data from the coded data buffer portion of the field data segment and displays it at the workstation.

Then, in accordance with the invention, the workstation accesses error location information from the error buffer portion of the field data segment, displays the digital document image at the workstation, and highlights a displayed portion of the field identified by the error location information.

The operator at the workstation can then generate second repaired coded data at the workstation.

Then, in accordance with the invention, the workstation inserts the second repaired coded data into the coded data buffer portion of the field data segment and inserts the first repaired coded data into the second repair data buffer portion of the second repair segment. In this manner, the best available version of the information in the extracted field image is kept in the coded data buffer portion of the field data segment.

The workstation can then transfer the MGDS to a utilization device which can access the contents of the coded data buffer portion of the field data segment for use as a corrected form of the recognition coded data.

In accordance with the invention, at each stage of repair, the best alternate trial strings and second guess characters can be included in the repair segments for each category field for use by the next stage of repair.

Also, in accordance with the invention, the level of certainty for the repaired coded data resulting from the previous repair stages, can be included in the previous repair segment. This enables the avoidance of subsequent attempts at further repair to particular fields when the current certainty level for that field is high.

Further in accordance with the invention, the MGDS may be stored in a repair history storage, to provide an audit trail for the character recognition repairs of important document forms. This is also useful for fine tuning the selection of special purpose character recognition processes for particular types of document fields and performance objectives.

DESCRIPTION OF THE FIGURES

These and other objects, features and advantages will be more fully appreciate with reference to the accompanying figures.

FIG. 1J(C) illustrates the MGDS 50C after the artificial intelligence error correction processor 28 has completed its operations on all six of the fields in the form.

FIG. 1J(D) illustrates the MGDS 50D after the data base error correction processor 30 has completed its operations on all six of the fields in the form.

FIG. 1J(E) illustrates the MGDS 50E after the manual verify and correction processor 32 has completed its operations on all six of the fields in the form.

FIG. 2A illustrates the master form 10F.

FIG. 2C illustrates the scanned form image 10' of a document form.

FIG. 3 illustrates the sequence of processing steps for the field 16' in the document form image 10' shown in FIG. 2C.

FIG. 4D illustrates the sequence of operational steps for the data base error correction process 30A.

FIG. 4E and 4E' illustrate the sequence of operational steps for the manual verify and correction process 32A.

FIG. 6 illustrates the relationships between machine generated data structure (MGDS) parameters.

FIG. 7A illustrates the form information portion FI of an MGDS.

FIG. 7B illustrates the page information portion PI for an MGDS.

FIG. 7C illustrates the field information format 54A for an MGDS.

FIG. 7D illustrates the coded data information portion 75 of an MGDS.

FIG. 7E illustrates the reject information portion S or R of an MGDS.

DISCUSSION OF THE PREFERRED EMBODIMENT

The repair history for a particular field of a document form is assembled in a machine generated data structure (MGDS) message. The MGDS is used as a data interface between the sequential repair processes and processors in the system. The MGDS also serves as the repository for the history of the repairs to the particular misrecognized character string, for the purpose of maintaining an audit trail.

Figure 1:
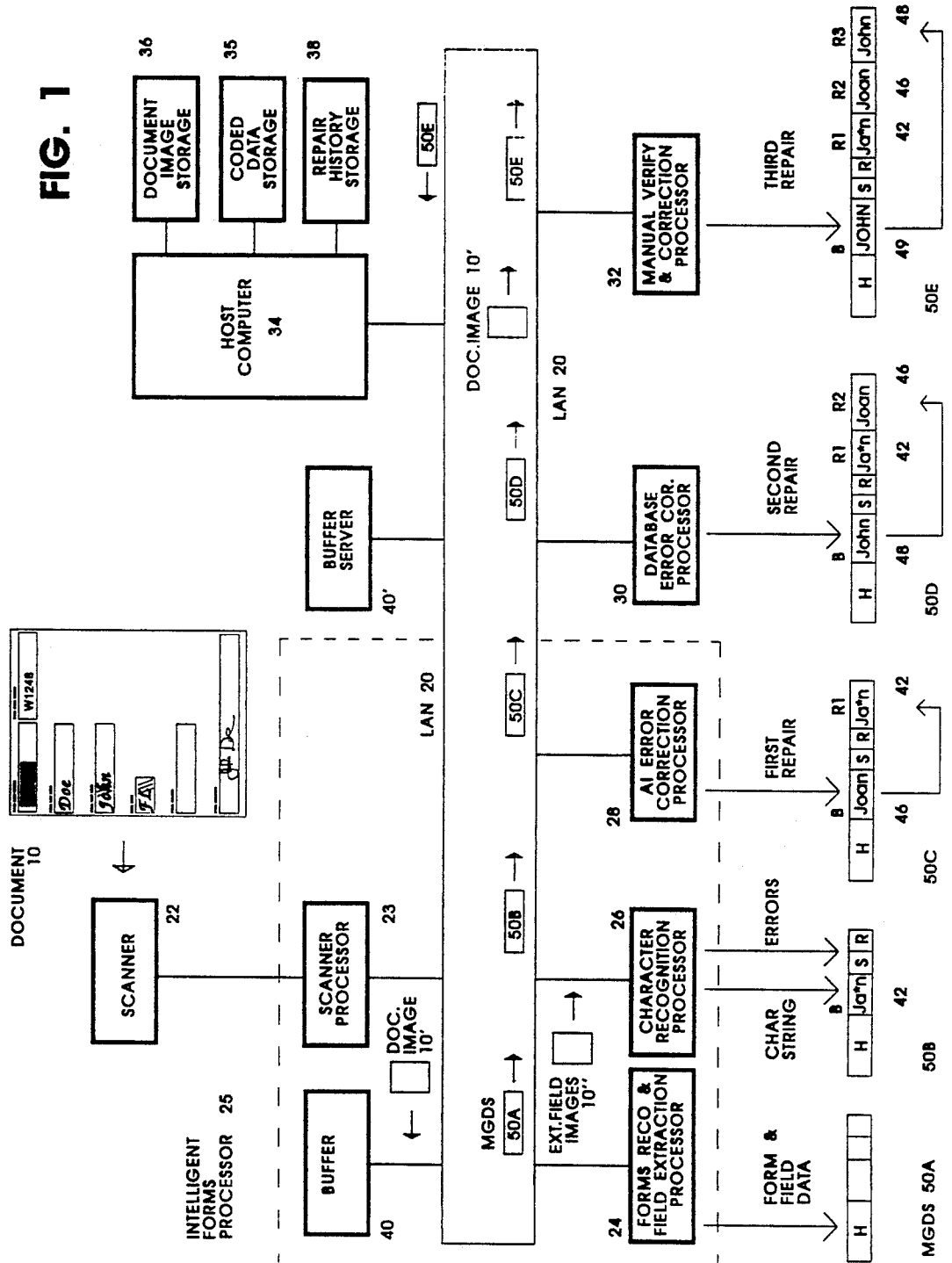
FIG. 1 and FIG. 1X which are composed of FIG. 1L and FIG. 1R, are the overall architectural diagram of the invention.
Figure 5A:
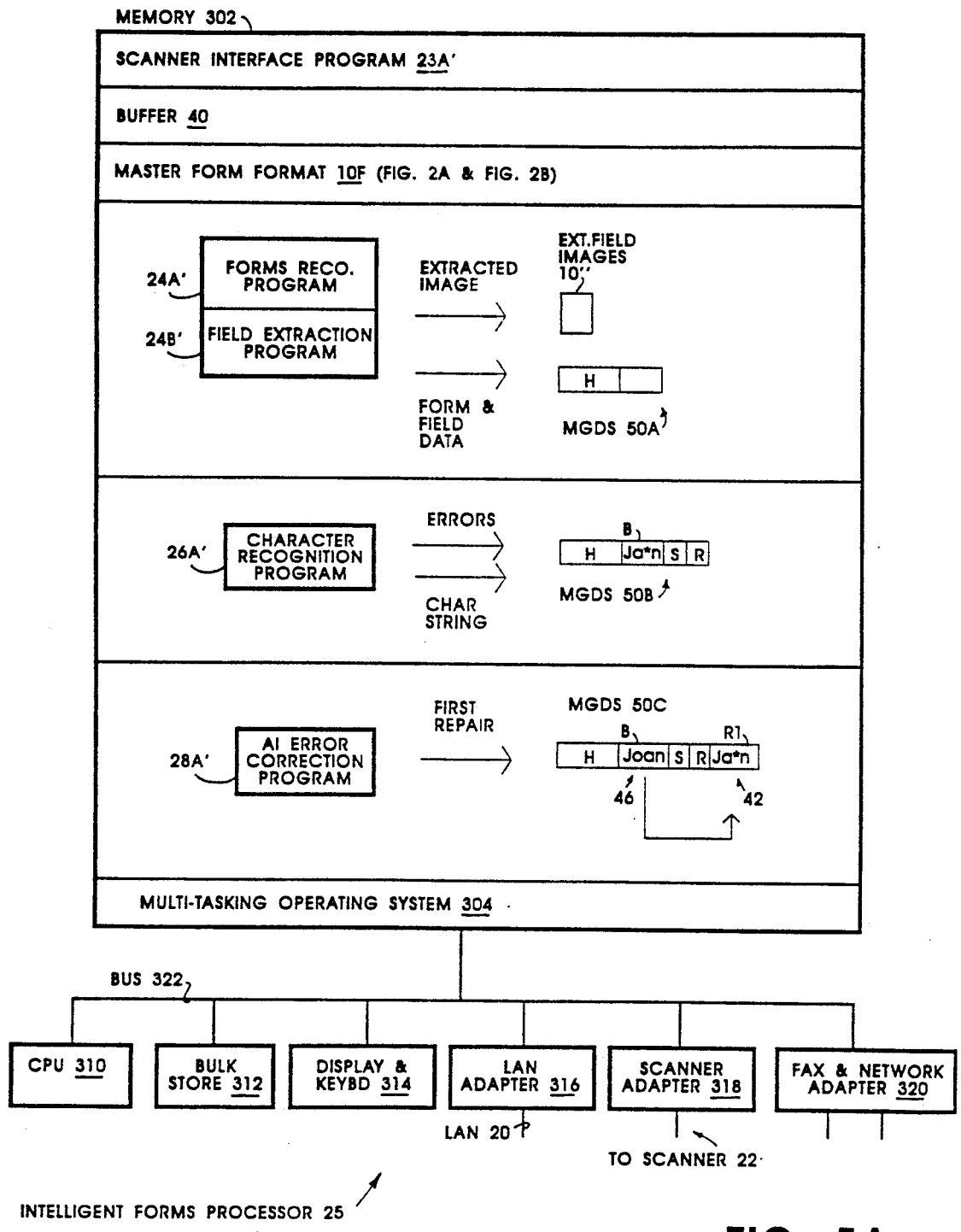
FIG. 5A illustrates a detailed architectural diagram of the intelligent forms processor 25.

FIG. 1 shows an overall architectural description of the data processing system for repairing character recognition errors for digital images of document forms. FIG. 1 is partitioned into a left half FIG. 1L and a right half FIG. 1R. A hard copy document 10 is scanned into the system with a scanner 22, resulting in a document image 10' which is shown in FIG. 2C. In the preferred embodiment of the invention, an intelligent forms processor 25, shown in greater detail in the architectural drawing of FIG. 5A, provides the scanner interface process with the scanner 22. The intelligent forms processor 25, shown in dotted outline in FIG. 1, also includes a buffer 40, a forms recognition and field extraction processor 24, a character recognition processor 26 and an artificial intelligence error correction processor 28. In the preferred embodiment of the invention, these various processors are implemented through corresponding computer programs which, when executed, perform the respective processes. In an alternate embodiment of the invention, as is shown in FIG. 1, the scanner processor 23, the buffer 40, the forms recognition and field extraction processor 24, the character recognition processor 26 and the artificial intelligence error correction processor 28, may each be separate processors connected together by the local area network (LAN) 20. In order to facilitate an understanding of the invention, the separate processor embodiment shown in FIG. 1 will be described first.

The local area network (LAN) 20 interconnects the scanner processor 23, buffer 40, forms recognition and field extraction processor 24, character recognition processor 26 and artificial intelligence error correction processor 28, to the host computer 34. Also connected to the LAN 20 is the data base error correction processor 30 and the manual verify and correction processor 32. In addition, an additional image capture facility buffer server 40' can be connected to the LAN 20. The host computer 34 has connected to it a document image storage 36, a coded data storage 35, and a repair history storage 38.

A document 10 is scanned into the system by means of the scanner 22, forming the document image 10' shown in greater detail in FIG. 2C. The document image 10' is a bit map representation of the image of the hard copy document 10. The scanner 22 outputs the document image 10' over the local area network 20 to the forms recognition and field extraction processor 24. A copy of the document image 10' can also be transferred to the host computer 34 and a temporary indexing identity can be assigned to the document image 10' so that it can be temporarily archived in the document image storage 36.

The forms recognition and field extraction processor 24 will include a library of master form definitions of forms which are to be processed by the system. The model of a form consists of a form pattern and a description of each field contained on a form. The form pattern is a set of characteristics that are used to distinguish one form type from another. The field description consists of the location of the field on the form expressed in Cartesian coordinates, an acceptance threshold for character recognition, identifying and field specifying information. A data field location can be expressed in the model by two points that describe the opposing corners of a rectangle. The rectangular area may be called a mask.

When the document image 10' is input to the forms recognition and field extraction processor 24, the image is analyzed to identify the form so that the appropriate master form definition data can be accessed. Several methods can be used for form recognition. One method matches the form number which may be typically printed on the document. A second method compares the layout or geography of the forms text and lines which may differentiate form types. A third method relies on the horizontal and vertical lines of the form. Once the document image 10' for the form is characterized, the corresponding master form definition data can be accessed which defines the coordinates for the respective fields, the names of the fields, and the code page for each respective field in the form.

Figure 4A:
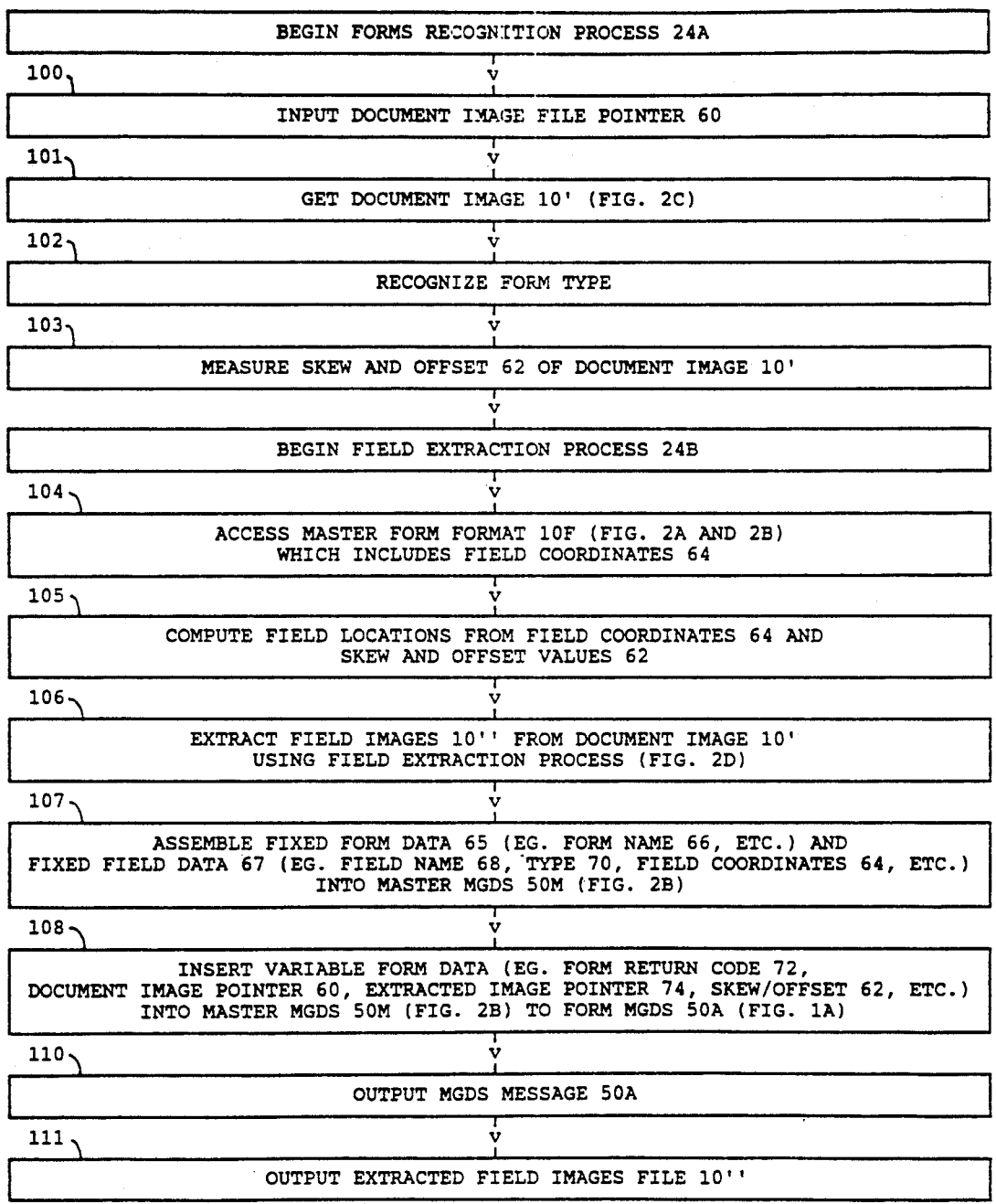
FIG. 4A is a flow diagram of the sequence of operational steps for the forms recognition process 24A and the field extraction process 24B.

FIG. 4A is a flow diagram of the sequence of operational steps carried out in the forms recognition process 24A and in the field extraction process 24B.

When the scanner 22 scans in the document 10, the scanner processor 23 can perform some front-end operations such as rescaling and compression of the image into an image file to which is assigned a file address. The image file of the document image 10' can be temporarily buffered in the buffer 40 or alternately in the buffer server 40', accessible under an assigned address. Alternately, the scanner processor 23 can output the document image 10' directly to the forms recognition and field extraction processor 24.

FIG. 4A begins the forms recognition process 24A with step 100 which inputs a document image file pointer 60 which enables accessing the document image 10' from the buffer 40 or from the buffer server 40'. Step 101 of FIG. 4A gets the document image 10' which is shown in FIG. 2C. The example scanned form image 10' has six data fields and one form number field. The form number field 11' contains a bar code representation of the identity of the form, which is an insurance claim form. The first data field is field 14' which is the last name field. The second field 16' is the first name field. The third field is 12a' which is the state field. The fourth field 12b' is the address field. The fifth field 44' is the signature field and the sixth field 12' is the serial number field. Note that the first through fourth fields and the sixth field contain images of alphanumeric characters whereas the fifth field 44' contains the image of a signature.

Step 102 of FIG. 4A recognizes the form type. In the example of FIG. 2C, the form type will be recognized from the bar coded form number in field 11'. Then, in step 103 of FIG. 4A, the skew and offset of the form is measured, as it was scanned into the system. Skew and offset values 62 are important in that they must be combined with the pre-specified coordinates of each field on the form in order to locate the actual position of the fields on the scanned form image 10'.

The flow diagram of FIG. 4A then transitions to begin the field extraction process 24B which starts at step 104 by accessing the master form format 10F which includes the field coordinates for the fields on the form 10'. The master form format 10F is shown in FIG. 2A. The data representing the coordinates of each respective field on the form are pictorially represented in FIG. 2A, which depicts the master form 10F. Field 11F is the form number field, field 14F is the last name field, and it is bounded by a boundary 13. Field 16F is the first name field and it is bounded by a boundary 17. Field 12aF is the state field. Field 12bF is the address field. Field 44F is the signature field, and field 12F is the serial number field. These fields shown in FIG. 2A are the pictorial representation of coordinate data which is provided in the master form definition data set corresponding to the insurance claim form in this example.

Figure 2B:
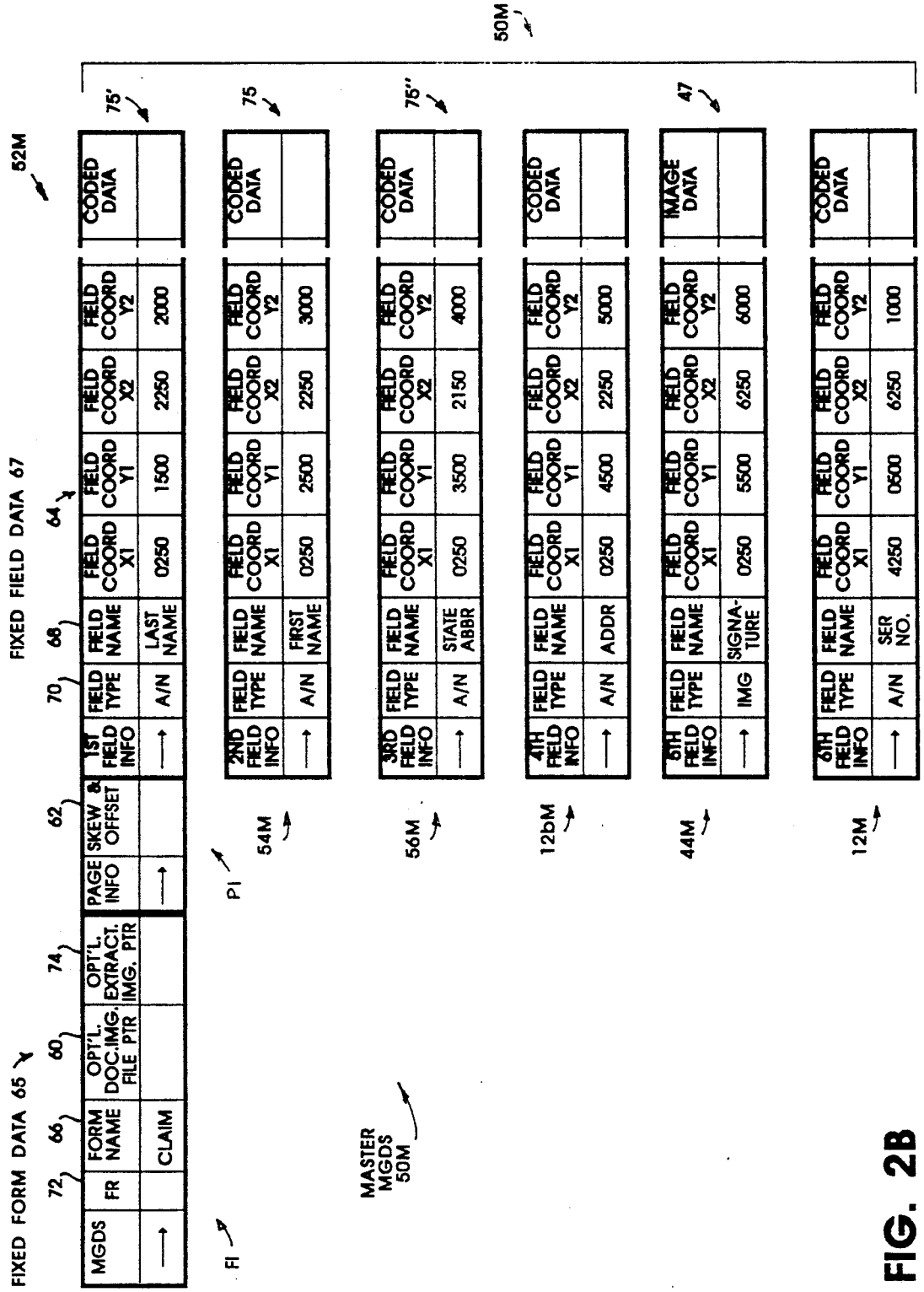
FIG. 2B illustrates the master MGDS 50M corresponding to the master form 10F of FIG. 2A.

FIG. 2B shows additional information which is included in the master form definition for the master form 10F shown in FIG. 2A. FIG. 2B depicts a master machine generated data structure (MGDS) 50M. The fixed form data 65 is included in the master MGDS 50M, such as the form name "claim," the number of fields and other like information such as is shown in the form information FI which is depicted in FIG. 7A. Also included in the fixed form data 65 of the master MGDS 50M of FIG. 2B is the page information PI for each page of the form. In the example shown herein, a single page form is employed. Fixed form data for a page would include for example the page number. Also included in the master MGDS 50M is fixed field data 64 for each of the six data fields in the master form 10F of FIG. 2A. Each field on the form is represented by a field data segment, such as field data segment 52M in FIG. 2B which corresponds to the first data field 14F in FIG. 2A. The field data segment 52M includes fixed field data 67 such as the field coordinates 64. Shown in FIG. 2B are the coordinates X1 and Y1 for the upper left-hand corner and X2 and Y2 for the lower right-hand corner of each rectangular field of the master form 10F of FIG. 2A. Also included in the fixed field data 67 is the field name, for example for the field data segment 52M corresponding to the last name field 14F of FIG. 2A, specifies that the field name 68 is "last name." Also included in the fixed field data 67 of FIG. 2B is the field type 70. For example, the field data segment 52M of FIG. 2B has a field type "A/N" which corresponds to alphanumeric.

Other field data 67 which can be included is shown in the field information depicted in FIG. 7C. The master MGDS 50M shown in FIG. 2B is one example of how the master form definition data can be organized and stored in the forms recognition and field extraction processor 24. The forms recognition and field extraction processor 24 will organize the fixed form data 65 for the form information FI and the page information PI and it will organize the fixed field data 67 for each respective field data segment 52M, etc. into a master MGDS 50M which it will transfer to the character recognition processor 26. Prior to such transfer, additional data will be added which is developed by the forms recognition process steps 100 through 103, and in particular the information which will be added is the skew and offset data 62 for the form image 10'.

Additional spaces can be allocated in the master MGDS 50M of FIG. 2B, for information which will be added at later stages in the recognition process. For example, the form return FR field 72 can have space allocated, optional document image file pointer 60 and optional extracted image file pointer 74 can be allocated. The coded data portion 75 can be added, among others. Each of these allocated fields in the MGDS 50M will be empty until they reach the processing stage in the system where the corresponding data is generated in the character recognition repair of the form.

Step 104 of FIG. 4A transitions to step 105 in the field extraction process 24B and computes the field locations for each field from the field coordinates 64 and the skew and offset values 62 provided in the master MGDS 50M. Field coordinate values 64 are provided for the first field for the first field data segment 52M, the second field data segment 54M, the third field data segment 56M, the fourth field data segment 12bM, the fifth field data segment 44M and the sixth field data segment 12M.

The field extraction process 24B of FIG. 4A now transitions to step 106 which extracts the field images 10" from the document image 10' using the field extraction process. Reference can be made to FIG. 3 which illustrates an example field extraction process. FIG. 3 shows the field image 16' for the first name field as it appears on the document image of FIG. 2C. The field image 16' is shown with the surrounding box 17, the characters 18 and the spurious lines 19 and 19a. In the process of field extraction, the image of the box 17 is removed. In addition, in the process of extraneous line removal, the image of the extraneous line 19a is eliminated, because a portion of it lies outside the pre-defined area of the field 16'. However, for this example, the extraneous lines 19 have not been removed from the image 18 of the characters in the field 16', as can be seen in the resulting extracted field 16" of FIG. 3. The extracted field image 16" will appear on the extracted field images 10" of FIG. 2D for the form.

An additional example of spurious lines which remain in the extracted field is shown for the state field 12a' in the form image 10' of FIG. 2C, whose corresponding extracted image 12a" still possesses the spurious lines overlapping the letter L in the state abbreviation for the state of Florida "FL."

Then the field extraction process 24B of FIG. 4A transitions to step 107 which assembles the fixed form data 65, for example the form name 66, etc., along with the fixed field data 67, for example the field name 68, type 70, field coordinates 64, etc., into the master MGDS 50M shown in FIG. 2B. Then in step 108, variable form data is inserted into the master MGDS 50M. For example, the form return code 72, which currently has a value of "zero," the document image pointer 60, which is the pointer address for the file of the document image 10', the extracted image pointer 74, which is the pointer address for the file containing the extracted image 10", the skew and offset value 62, and other data currently available at this stage in the forms recognition and field extraction processor 24.

Figure 1A:
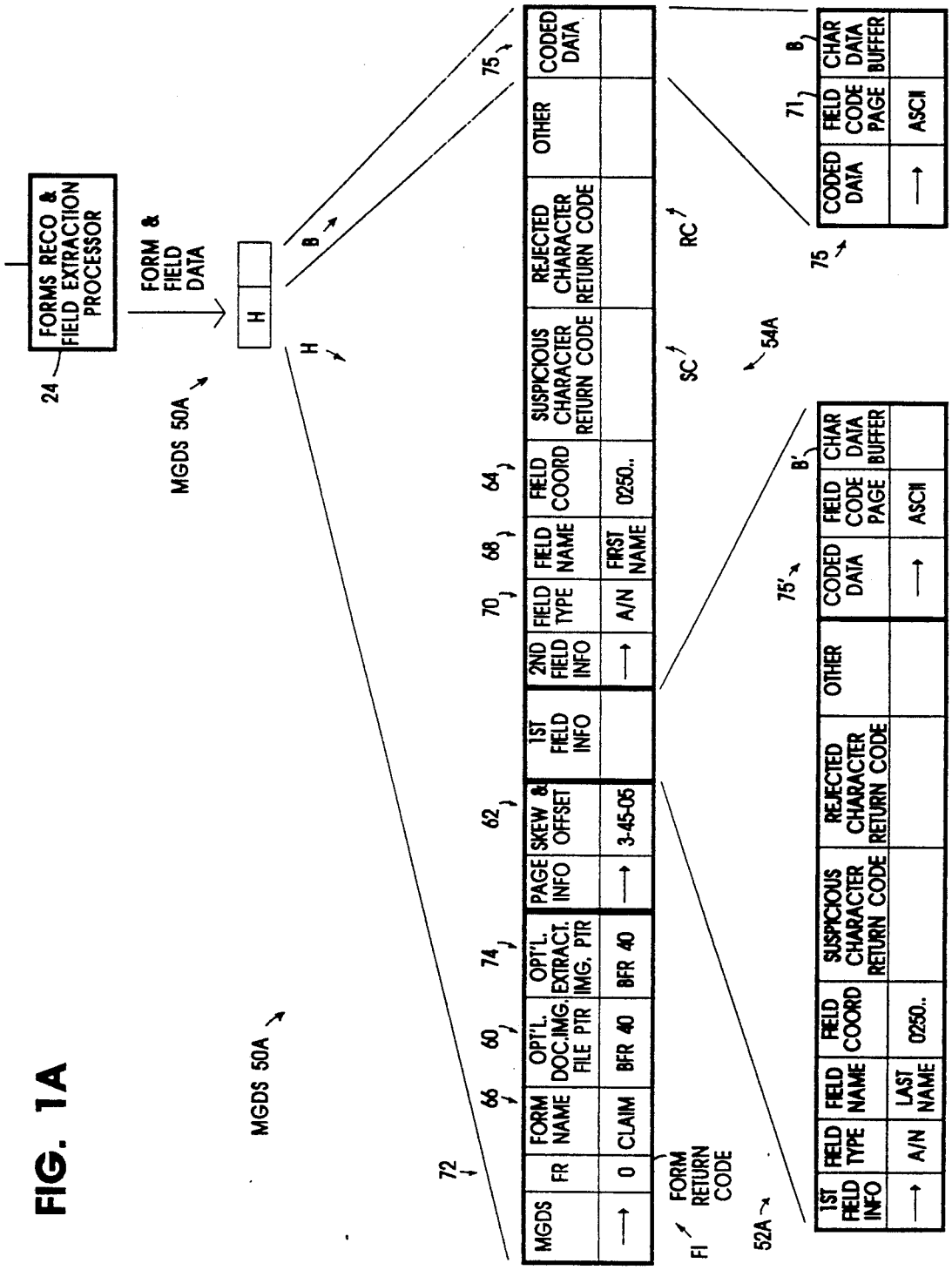
FIG. 1A illustrates the machine generated data structure (MGDS) 50A from the forms recognition and field extraction processor 24.

Then the field extraction process 24B of FIG. 4A transitions to step 110 which outputs the MGDS message 50A shown in FIG. 1A, to the character recognition processor 26. If this were the multi-task embodiment of these processes in the intelligent forms processor 25 of FIG. 5A, then the transfer of the MGDS message 50A would be to a commonly accessible partition in the memory of the processor 25. Alternately in the multiprocessor LAN embodiment of FIG. 1, the MGDS message 50A is transferred over the LAN 20 to the character recognition processor 26.

The process of FIG. 4A then transitions to step 111 which outputs the extracted images file 10". The extracted field images file 10" can be placed in a file whose address is referred to by the extracted image pointer 74, and the extracted image 10" can then be stored in the buffer 40 or the buffer server 40'. Alternately, the extracted field images 10" can be transferred directly to the character recognition processor 26.

FIG. 1A shows a more detailed illustration of the MGDS 50A as it is output from the forms recognition and field extraction processor 24. In particular, the MGDS 50A shown in FIG. 1A is depicted for the first field data segment 52A and the second field data segment 54A corresponding to the first two out of the six fields of the form image 10' shown in FIG. 2C.

FIG. 1F shows the MGDS 50A output from the forms recognition and field extraction processor 24 at a later stage in the assembly of the MGDS 50A, when it includes not only the first field data segment 52A and the second field data segment 54A but also the third field data segment 56A corresponding to the third field 12a' on the form image 10' of FIG. 2C.

The forms recognition and field extraction processor 24 will generate a first stage MGDS data structure message 50A which is shown in greater detail in FIG. 1A. A specific format for the form information in the MGDS 50A, is shown in FIG. 7A. The form return code parameter has a length entity with a value of six, an ID entity and a data entity. The data entity is two bytes long, the ID entity is two bytes long and the length entity is two bytes long, and thus the value in the length entity is six, which represents the total number of bytes in the parameter. The MGDS groups related parameters together to allow the entire group of associated parameters to be passed and parsed easily. The parameters are grouped by specifying a parameter that is intended to encompass several sub-parameters. Such an encompassing parameter or container object, for example the field information parameter, is shown in FIG. 7A to have a length entity, an ID entity and a data entity. Included in the data entity is an arrow which indicates that the encompassing parameter's data is the group of parameters that follow within the length specified for the encompassing parameter in its length entity. Note that the lengths and IDs are hexadecimal values.

The form information FI which is included in the beginning portion H of the MGDS 50A, includes the parameters shown in the FIG. 7A. The MGDS parameter is an encompassing parameter which encompasses the entire MGDS 50A. The MGDS version parameter states the version of MGDS being used. The form return code parameter will indicate if errors were encountered when processing the image. If the return code indicates errors existed at the field level, the rejected character and suspicious character return codes must be checked to determine the exact error. The form return code is the main indicator to determine if reject processing is required on a document image. Negative return codes will indicate a processing error occurred at the form or field level so that the form may actually be mis-identified. Positive return codes will indicate the number of rejected and suspicious characters that were found on the form for all of its fields. This return code can be reset to zero after error correction has successfully taken place.

The when-to-convert parameter indicates if the application creating the MGDS, that is the forms recognition and field extraction processor 24, has converted the character data in the MGDS to the appropriate host code pages. A parameter value of zero indicates that the application creating the MGDS has left the character data in the original ASCII code pages in which it was created and the numeric data appears in the workstation byte order where the hexadecimal representation of numerics is read by flipping the bytes. A value of two indicates that the application creating the MGDS converted the character data to the appropriate host EBCDIC code pages and the numeric data replica appears in the host byte order where the hexadecimal representation of the numerics is read without flipping the bytes. A value of one requires inspection of the form return code to determine the byte order of the numeric data and whether the character data has been code page converted.

The form class name parameter indicates the name of the form class recognized for the form. This name is defined by the forms recognition and field extraction processor 24 which performs the form recognition operation.

The form name parameter gives the name of the form as it is defined by the forms recognition and field extraction processor 24 performing the form recognition operation.

The general code page parameter is the code page for the unrecognized character flag, the form class name, field names, field associations and field repaired parameters. An assumption is made that all of these items will appear on one code page. If several code pages exist for these different items, the code page of the unrecognized character flag will be used.

The unrecognized character flag parameter is used to denote an unrecognized character in the character data buffer. The number of fields parameter indicates the number of fields that data will be returned for in the MGDS.

The form code page parameter is used for all the data on the form. If all the data on the form uses the same code page, this parameter will show that code page. If different code pages are used on the form, this field will not be returned and the field code page parameters will indicate the code pages in each field. As data is translated from code page to code page and stored back in the MGDS, this parameter should reflect the current code page for the forms data.

The host form code page parameter is the code page that the host has specified for all character information retrieved off the image. Characters should be converted to this code page before the information is submitted to the host for final processing. All character information that is associated with the form code page parameter will be translated to the host code page based upon the when to convert parameter value.

The host code page parameter indicates the host code page to which the field information for a specific field code page should be translated. This parameter maps one-to-one with the field code page parameters when they are present to indicate the host code page to which the data in the specific field should be translated.

The page information parameter is an encompassing parameter that encompasses information about each page of a document. This parameter does not encompass information about fields on each page.

The field information parameter is an encompassing parameter for a field data segment and is used to group all of the information that is returned for each respective field on a page of the form. There is no information in the parameter other than the length of the entire set of field data for each field.

Page information formats are shown in FIG. 7B. The page number parameter provides a page number for information that appears in the page information encompassing parameter. The page resolution parameter provides that the resolution of a specific page indicated by the page number parameter located in the page information parameter. The page orientation parameter provides the orientation of a specific form page. The values indicate no rotation or a positive clockwise rotation of 90, 180 or 270 degrees.

FIG. 7C illustrates the detailed format of field information. The rejected character return code parameter indicates rejected characters were encountered during the character recognition process. This parameter will not be filled with data until the character recognition processor performs its operation. The number in this field indicates the number of rejected characters that were encountered in the field. If the number is negative, it indicates an error was encountered while processing the field.

The suspicious character return code parameter will indicate suspicious characters were encountered during the character recognition process by the character recognition processor 26. The number in this field indicates the number of suspicious characters that were encountered in the field. The field association parameter is used to associate the field with the host fields. This is the ID the user will enter into a forms definition utility to indicate its association value and is provided by the forms recognition and field extraction processor 24. This field differs from the field name parameter because it is used to describe the field in terms of an application use rather than in terms of the field as it appears on the form. For example, this field may contain indexing information which is significant to a host application.

The field name parameter is the field description that will be used to describe the field during error correction and data entry. The field form page parameter is the form page on which the field appears.

The field coordinates parameter is filled out by the character recognition processor 26, with the coordinates of the field used for highlighting the field and further processing of the field in subsequent repair stages. These coordinates are the upper left and lower right coordinates of a rectangle enclosing the field and are based on a coordinate system with the 00 coordinate located in the upper left corner of the image. Each of the four coordinate values uses four bytes, that is the X left, Y bottom, X right and Y top.

The coded data parameter shown in FIG. 7D, is an encompassing parameter that is used to group all character information having the same code page in each field. Since multiple code pages may be used in each field, the coded data parameter will group the code page and the character information. Character information will not be supplied until the character recognition processor performs its operation. There is no information in this parameter other than the length of code page and character information. The presence of the coded data parameter is mutually exclusive with the presence of the field existence parameter. Both parameters may not exist for the same field at the same time. The field existence parameter denotes whether the field contains data or not and can be used for example a check box field.

Reject character information parameter shown in FIG. 7E, is an encompassing parameter which will be added by the character recognition processor 26, and is used to group all information about a rejected or suspicious character. There is no information in this parameter other than length of the reject information.

Optionally, an image data parameter (not shown) may be included in the MGDS message 50A, provided by the processor 24. After the processor 24 has performed its field extraction operation, the cleaned-up image of the field can have its bit map arranged in serial order and optionally compressed and loaded into MGDS 50A Reference to FIG. 6 will illustrate the relationships among the various MGDS parameters in an MGDS message structure. It is seen that form information is a part of the beginning portion H for the MGDS 50A. That is followed by the page information which is clustered together as shown in FIG. 6. This is then followed by several field information segments, each field information segment corresponding to one of the fields of the subject form. Within the field information segment will be one or more coded data segments, each coded data segment corresponding to a portion of the field characterized by a single code page. If the entire field is characterized by a single code page, then there will be a single coded data segment for the field. Also included with the field information will be any reject character information which may be produced by the character recognition processor 26.

The character recognition process 26A performed by the character recognition processor 26 will operate upon the image 16" of FIG. 3 to produce the character string 42 "Ja*n."

Figure 2D:
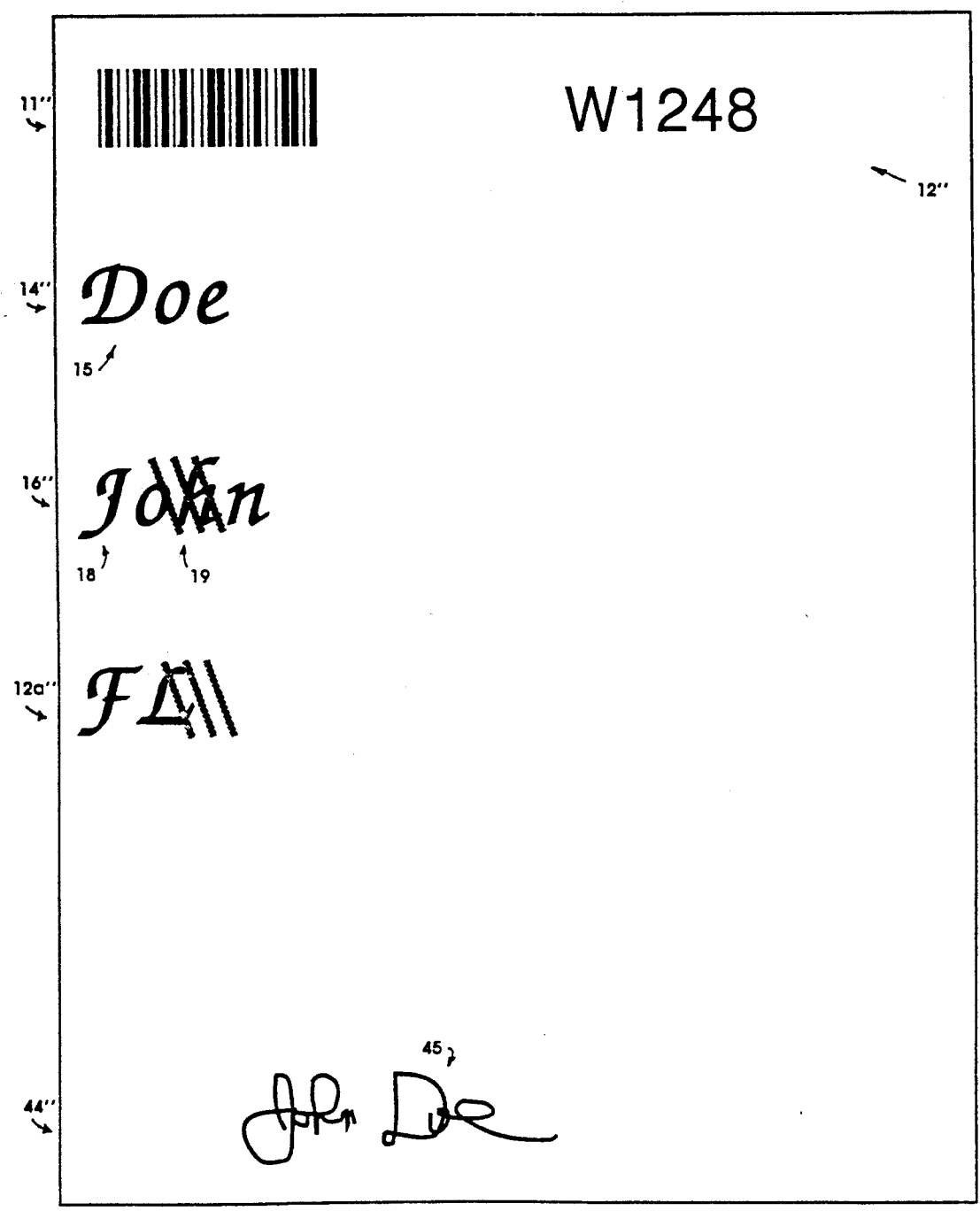
FIG. 2D illustrates the extracted field images 10" from the scanned form image 10' of FIG. 2C.
Figure 4B:
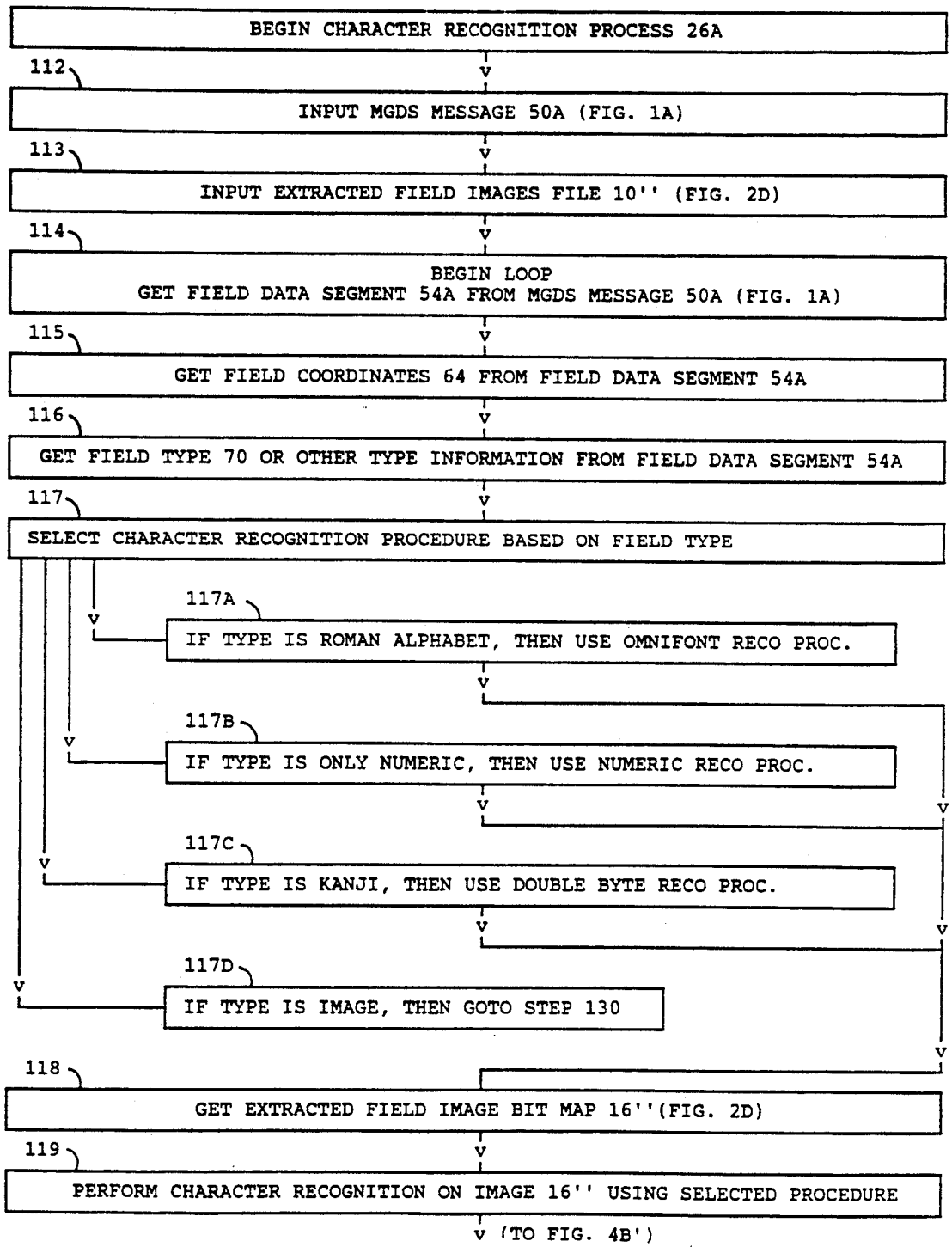
FIGS. 4B and 4B' illustrate a flow diagram of the sequence of operational steps for the character recognition process 26A.

FIGS. 4B and 4B' are the flow diagram of the sequence of operational steps for the character recognition process 26A. Step 112 inputs the MGDS message 50A, as is shown in FIG. 1A. Then step 113 inputs the extracted field images file 10", as shown in FIG. 2D.

Then step 114 begins a loop for each respective field data segment. Step 114 gets each respective field data segment from the MGDS message 50A shown in FIG. 1A. The first field data segment 52A for the last name field 14", is processed first. Next the loop will get field data segment 54A from the MGDS message 50A, for the second field 16". The example herein focuses on the second field which is the first name field and its field data segment 54A.

Step 115 of FIG. 4B gets the field coordinates 64 from the field data segment 54A. Then step 116 gets the field type information 70 from the field data segment 54A. Field type information 70 can include a wide variety of character styles which can be specified as the type expected for the field. If a particular form is usually filled out by hand, then handprinting would be indicated in field type information 70. Machine printed numerals or Kanji, Hebrew or Cyrillic alphabets are other character styles which can be specified as the expected field type 70.

Then in step 117 of FIG. 4B, the type of character recognition procedure is selected based upon the field type or other characteristics expected for the characters whose images appear in the field 16". The type of character recognition procedure conducted for a particular field can be optimized for performance or accuracy if information is available on the type of characters expected for the field. For example, in step 117A, if the field type information 70 indicates that machine printed Roman alphabetic characters will be present in the field, such as for an ASCII code page, then a standard OMNI font recognition procedure can be used. Alternately, in step 117B, if the field type information 70 indicates that the field is strictly a numeric field using Arabic numerals, then a numeric recognition procedure can be used which will have better performance since ambiguities in recognition will be resolved in favor of numerals as opposed to letters for such a field. Alternately, in step 117C, if field type information 70 or code page 71 indicates that the field is expected to contain Kanji Japanese characters, then a double byte recognition procedure must be employed. Alternately, in step 117B, if the field type information 70 indicates that it is an image field, then no character recognition will be performed, but instead the process will go to step 130 and the image itself will be extracted and passed through to the field data segment. Alternately, if the image is specified as a signature, a cursive character recognition process can be applied (not shown). Also, a signature verification process can be applied (not shown).

Then in step 118 of FIG. 4B an extracted field image bit map 16" is obtained, as is shown in FIG. 2D. Then in step 119, the character recognition procedure is performed on the image 16".

The image created by the data extraction process provides a clean image of the data to be recognized in the character recognition processor 26. This is done field by field, with the characters in each field extracted as a single image block. Before a field image can be recognized, it must be segmented into individual character images. These are recognized in turn by a character classifier. Segmentation will identify the pitch or distance from the character to character, separate touching characters and merge broken characters. It will identify the skew of the typing, if any, and other idiosyncrasies of the particular string image in the field. The character recognition classifier accepts a single character pattern as in input and returns an identification symbol and ASCII or EBCDIC code. When documents arrive from many different sources as is usually the case with typed data on forms, a library of tree logics is needed, one for each font that will be encountered. Fonts having size characteristics that match those of the printing are tried for recognition and each classifier provides its own estimate of the accuracy of its own recognition. These estimates are evaluated to select the best classifier for reading the remainder of the image. In addition, a list of prototype patterns can be output which are representative of the input having the property that no two prototypes match one another and that every input pattern matches some prototype, each prototype being defined as a cluster. The cluster consists of all patterns that match it. Cluster information can be output by the character recognition processor for use by subsequent stages of repair.

Figure 1B:
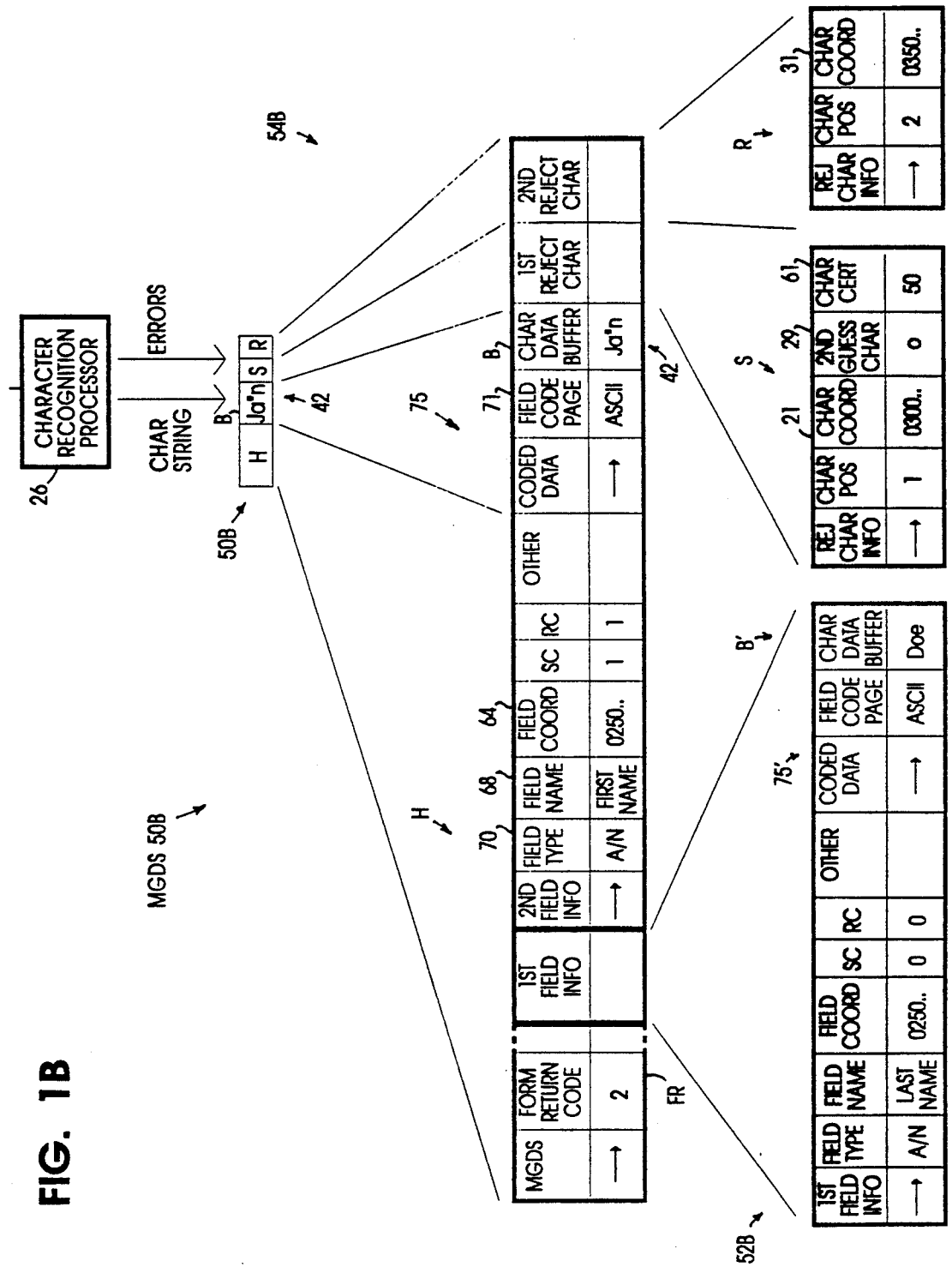
FIG. 1B illustrates the MGDS 50B output from the character recognition processor 26.
Figure 1C:
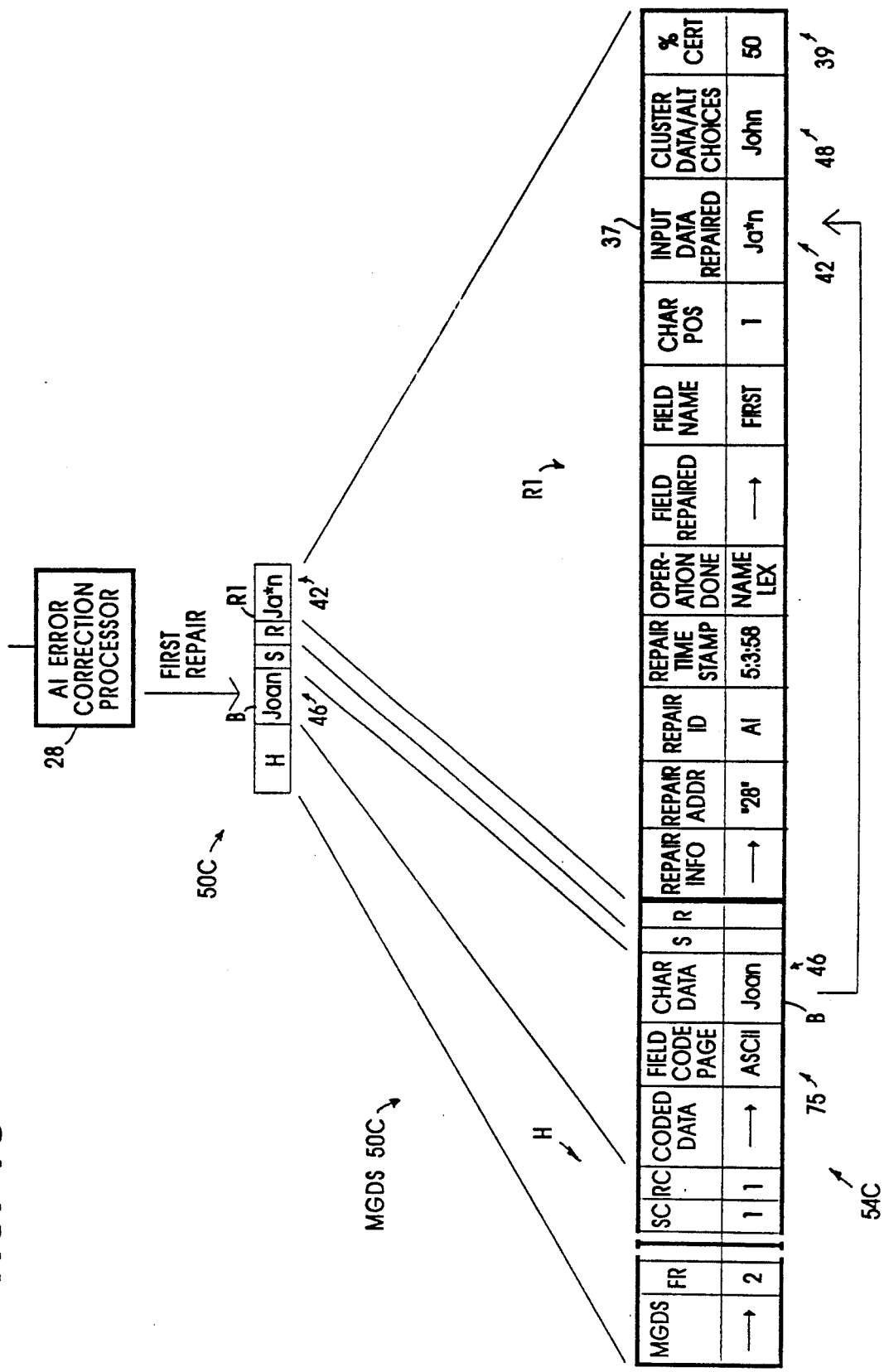
FIG. 1C illustrates the MGDS 50C including the first repair segment R1 output from the artificial intelligence error correction processor 28.
Figure 1D:
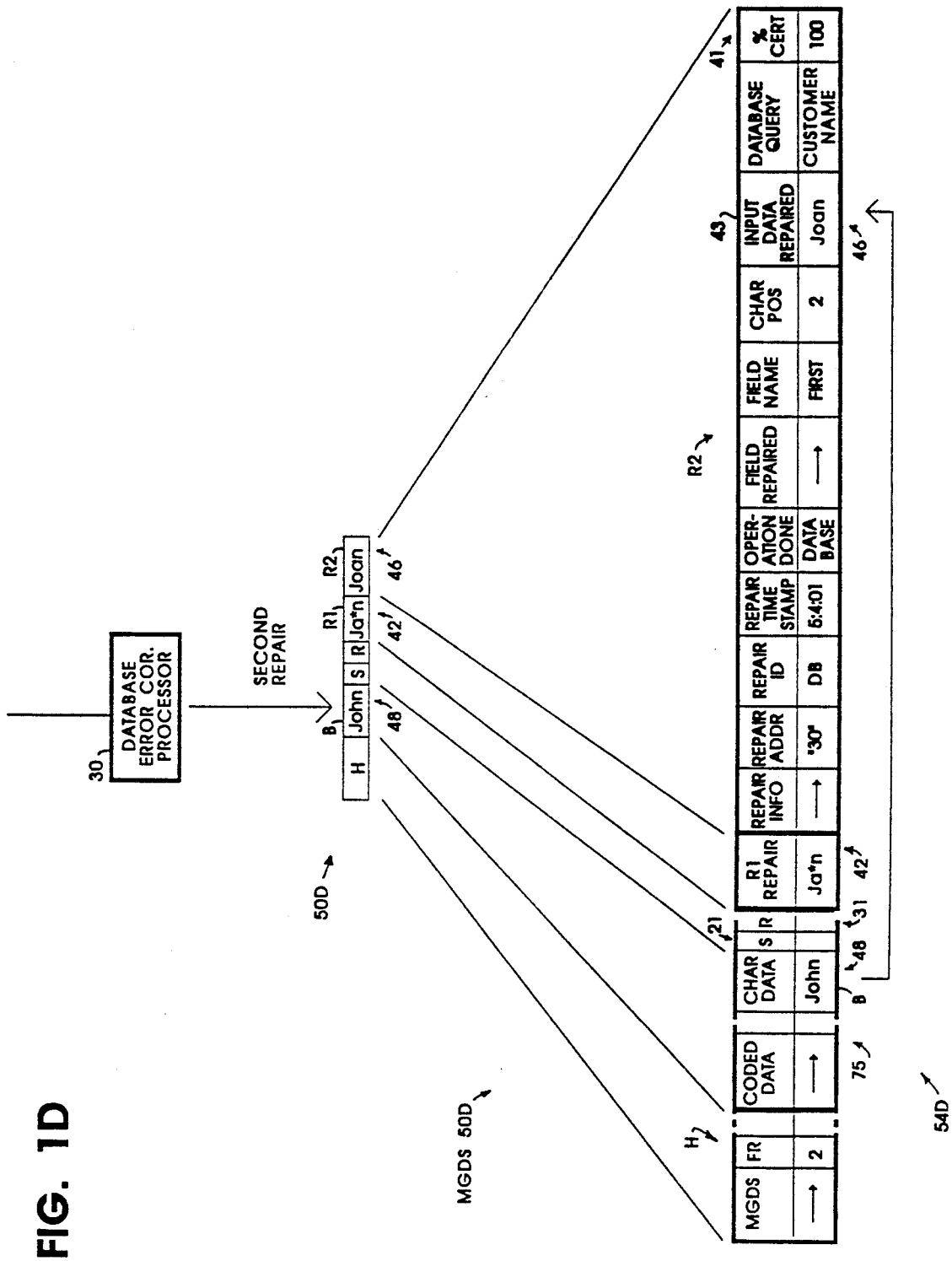
FIG. 1D illustrates the MGDS 50D including the second repair segment R2 output from the data base error correction processor 30.
Figure 1E:
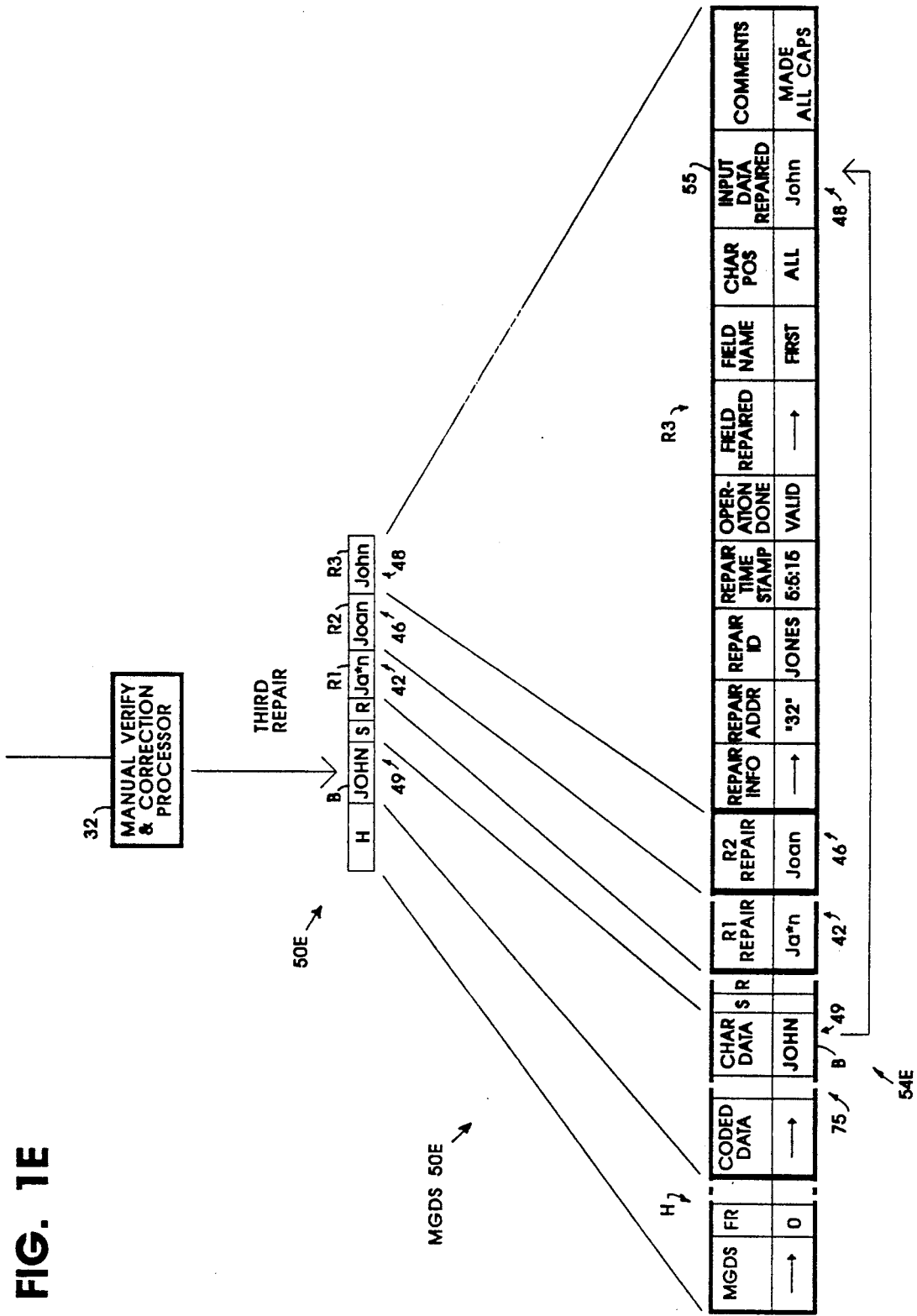
FIG. 1E illustrates the MGDS 50E including the third repair segment R3 output from the manual verify and correction processor 32.

Reference to FIG. 1B will illustrate some of the information that can be added by the character recognition processor 26 to the MGDS message 50B. The character data buffer B would be loaded with the recognized character string which includes the fully recognized characters "J" and "n," the suspicious character "a" and the position of the reject or unrecognized character which is indicated by an asterisk "*." In addition, first reject character information S will be placed in the reject character information segment identifying the character position, the character coordinates, a second guess character and a character certainty. The character position for the first character is indicated as "0," the second character is indicated as "1" and so on. Thus, character position for the suspicious character "a" is indicated as "1." The character coordinates are provided for the location in the field image of the suspicious character "a." In addition, the character recognition processor 26 will have formulated several candidate alternate characters which have a lesser certainty value. The next highest certainty value corresponds to the character "o" and this is the second guess character which is provided in the second guess character parameter of the reject information segment S. In addition, the character certainty of 50 percent, in this example, is also loaded into the reject character information segment S. A second reject character information segment R is provided for the reject character position "*." The character position is indicated as two, indicating it's the third character position, and the coordinates for that character position are provided for the field image. This information is loaded into the MGDS message 50B of FIG. 1B.

Returning now to FIGS. 4B and 4B' the character recognition process 26A, step 120 generates the coded data 42 using the selected recognition procedure as indicated in FIG. 3. Then in step 121, the unrecognized characters 31 are flagged as shown in FIG. 3, and the character return code RC is incremented by one and the form return code FR is also incremented by one, as is shown in FIG. 1B.

Then in step 122, the character recognition process identifies as "suspicious" any character position 21, as shown in FIG. 3, that is recognized with a certainty level which is below an established threshold. The suspicious return code SC is incremented by one and the form return code FR is also incremented by one, as is shown in FIG. 1B.

Then in step 123, the coded data 42 consisting of the recognized characters "J" and "n," the suspicious character "a," and the reject flag "*" are loaded into the character data buffer B of the field data segment 54B, shown in FIG. 1B.

Then, the field data segment 54B is augmented with a sub-segment S for the suspicious character error data, and sub-segment S is loaded with the location coordinates 21 of the suspicious character, as is shown in FIG. 1B.

Then in step 125, the second guess character 29 for the suspicious characters are loaded into the sub-segment S, as shown in FIG. 1B. In this example, the second guess character 29 is a "o." then in step 126, the certainty value 61 for the suspicious character is loaded into the sub-segment S of FIG. 1B. In this example, the certainty of the first guess 27 character "a" is 50 percent and this value is value 61 for the certainty.

Then in step 127, the field data segment 54B is augmented with the sub-segment R for the rejected character error information, which is loaded with the location coordinates 31 of the reject character position, as is shown in FIG. 1B. Then, step 127 flows to step 134 to determine if another field data segment is to be processed.

Step 130 was branched to by the previous step 117D, if the type indication for the field is an image field. In step 130, for the field type being an image field, the extracted image bit map 44" in FIG. 2D, is obtained and then in step 131, it is loaded into the image data sub-segment 47 of the field data segment 44B shown in FIG. 1I. This would occur for the fifth field 44" of the extracted field images 10" of FIG. 2D, where the signature 45 is located. Since the fixed field data for the field type 70 of the field data segment 44M in FIG. 2B, indicates that the field type is an image and the field name is "signature," the fifth field data segment 44B in FIG. 1I will have the image bit map 44" loaded into the bit map portion 53 of the MGDS 50B. Then step 131 of FIG. 4B flows to step 134.

Additional information can be included in the field data segment 44B of FIG. 1I. For example, the resolution and compression information 51 for the image 44" can be included. This information is contained in an image data portion 47 of the field data segment 44B.

Then in the flow diagram of FIG. 4B, step 134 determines whether there are additional field data segments to be processed for additional fields in the extracted field images 10" of FIG. 2D. If there are, then the loop goes back to step 114. Alternately, if there are no more field data segments to be processed, then the process flows to step 136 which outputs the MGDS message 50B, which is shown in FIG. 1J(B).

Figure 1G:
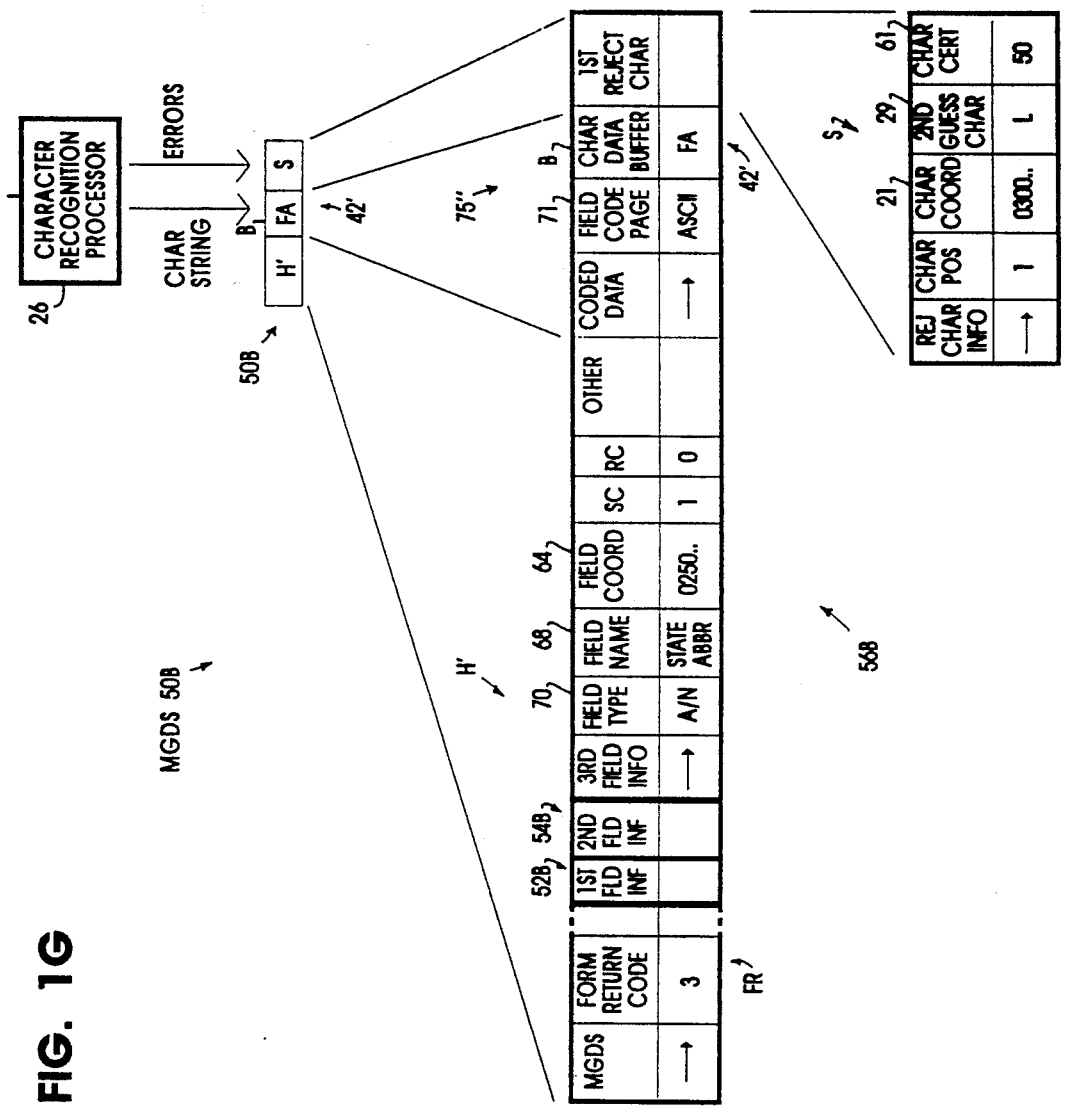
FIG. 1G illustrates the MGDS 50B after having generated the character string and error information for the third field data segment 56B.

The third field data segment 56B is shown in FIG. 1G, corresponding to the state field 12a" in FIG. 2D. It is seen in FIG. 2D, that the "L" in the abbreviation for the state of Florida, has spurious marks which overlay it. The character recognition processor 26 interprets the first guess for the second character position as "A," and therefore the character string "FA" is entered into the character data buffer B of the field data segment 56B of FIG. 1G. The character recognition processor 26 also determines that the second guess for the second character position is a "L" and this second guess "L" 29 is entered into the second guess character portion of the suspicious character sub-segment S shown in FIG. 1G.

FIG. 1J(B) shows the character buffer B for the coded data for each field segment of the six fields in the form of FIG. 2D. The first field segment 52 has the character string "Doe" in buffer B. The second field segment 54 has the character string "Ja*n" in its buffer B. The third field segment 56 has the character string "FA" in its buffer B. The fourth field segment 12b has its buffer B empty since there was no corresponding image information in the field 12b' of the form image 10' of FIG. 2C. The fifth field data segment 44 has the signature image 45 in its field image portion. The sixth field data segment 12 has its buffer B containing the string W1248. The contents of each of the character buffers B in each respective field data segment is the best current estimate of the correct alphanumeric string which corresponds to the image contained in the respective field of the extracted field images 10" of FIG. 2D.

The coded data information format shown in FIG. 7D depicts the field code page parameter which is the code page used for each specific character string in the field. Whenever code page changes in a field, the field code page parameter will precede the character string that uses it. If all the code pages on the form are the same, then the field code parameter need not be used and the form code page parameter will indicate the code page that should be used for all character data on the form.

The character buffer parameter B is also shown in FIG. 7D and that is the location for storage of the character string that uses one code page. If the field contains no characters, but the field was indicated to be a mandatory field by the processor 24, the rejected character return code will indicate no value was an error. The character buffer is the repository for the current corrected value of the character string representing the field. At each sequential stage of field repair, the highest probability character string representing the field will be loaded into the character buffer B.

The reject information format is shown in detail in FIG. 7E. The reject character information encompassing parameter encompasses the character position parameter which identifies the position of the character in the string of characters for the entire field. This is required so that an association between the character value and the image character can occur at the respective repair stations. This position indicates the character position in the field and not the number of bytes preceding the character.

The MGDS message 50B is transferred over the LAN 20 to the artificial intelligence error correction processor 28, to accomplish a first repair of those fields whose field segments have an error. The correction processor 28 can be a part of the character recognition processor 26 in some embodiments. An example of an artificial intelligence error correction process would be the lexical testing of the character strings produced by the character recognition processor 26. Generally the data contained in a particular field of a form are constrained in the sense that not every character string is permissible. An amount field is typically filled with numeric data and a name field is typically filled with alphabetic data. Such constraints are useful for character recognition correction. For example, if a particular field is only numeric, then a comparison of suspicious characters in the field with numeric characters will be appropriate. An example of this would be a zip code field where one or more of the numeric characters in the image of the zip code field were either suspicious or not read. If the state or especially the state and city fields of the form were read without unrecognized characters, then a lexical analysis can be performed using the data base equivalent of a zip code directory to fill out the most probably numeric values for the rejected or suspicious characters in the zip code field. For particular types of fields, not only digits, but also letters and punctuation can be inferred from positions or the context of the misread character. For example, if a particular field is a state field, and there is a misread character in the field, a list of the 50 states can be used in a lexical analysis, to find the highest probability match for the characters that are accurately recognized, thereby enabling the inference of the values for those characters which are rejected or suspicious.

Still another application, and one used in the example herein, is common English given names or first names.

The MGDS 50B is input to the artificial intelligence error correction processor 28, and the first name field 16" contains the letters "John" which is the character image 18. The output character string 42 of "Ja*n" from the character recognition processor 26, will be processed in the error correction processor 28 using lexical analysis. The corresponding second guess character "o" for the second character in the string 42 will also be tested using a lexical analysis to test "Jo*n." The lexical analysis example is of given names having four letters with the first letter being "J" and the last letter being "n." A lexical analysis will draw upon a list of candidate names such as "Joel," "Jack," "John," "Jake," "Jane," "Jean," "Jill," "Joan," "Judy," and "June." The example of the lexical analysis performed by the artificial intelligence error correction processor 28, requires that the input MGDS message 50B supply some information in connection with the field, to enable the first repair to take place. The information supplied is the character string from the character data buffer B of the string 42 "Ja*n," and the second guess character for the second character position, namely "o." The artificial intelligence error correction processor 28 will determine from its lexical analysis that the string "Joan" has a 50 percent certainty and the string "John" also has a 50 percent certainty.

Figure 4C:
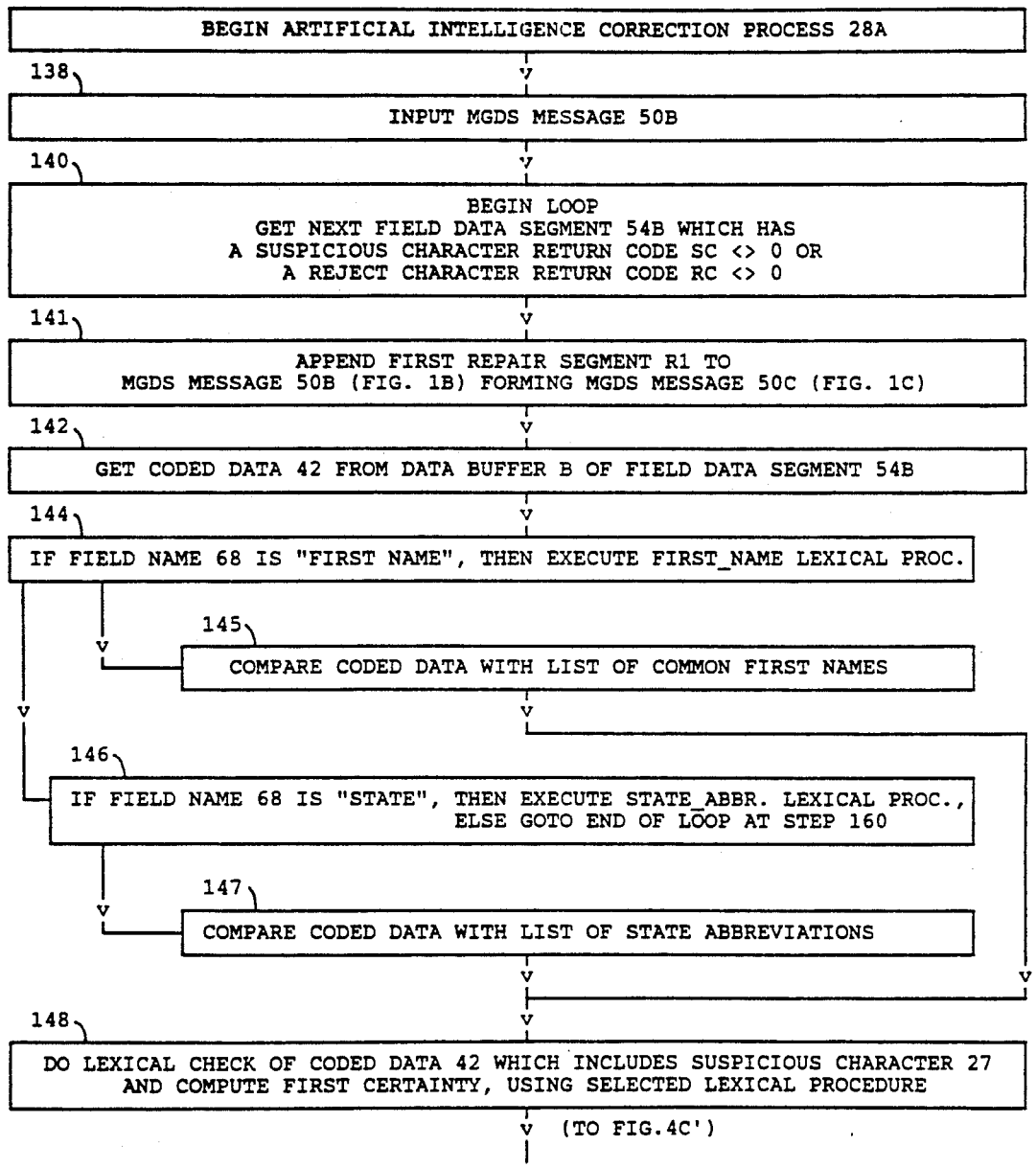
FIG. 4C and 4C' illustrate the sequence of operational steps for the artificial intelligence error correction processor 28A.

The artificial intelligence correction process 28a is shown in a flow diagram which is a sequence of operational steps in FIGS. 4C and 4C'. The process starts in step 138 which inputs the MGDS message 50B. Then in step 140, a loop begins in which the next field data segment has its suspicious character return code SC and its reject character return code RC examined to determine if there are any suspicious characters or reject characters for that field. As can be seen for the first field data segment 52B of FIG. 1B, the character recognition processor 26 determined that there were no suspicious characters or reject characters. Therefore step 140 will go to the next field data segment 54B to determine if there are any suspicious characters or reject characters for that field. As can be seen in FIG. 1B, the field data segment 54B indicates that there are a suspicious character SC return equal to one and a reject character RC return code equal to one.

The process of FIG. 4C then transitions to step 141 where, in accordance with the invention, a first repair segment R1 is appended to the MGDS message 50B as shown in FIG. 1B, forming the MGDS message 50C, now shown in FIG. 1C. The first repair segment R1 provides space for the compilation of a history of the repair which is about to be made by the artificial intelligence correction process 28A on the contents of the character data buffer B of the field data segment 54B in FIG. 1B. The first repair segment R1 will include data such as the repair address for the artificial intelligence error correction processor 28, the identity of the type of correction, the repair time stamp, the operation done, and then information on the field repair itself, such as the field name, character position repaired, and other information which will be explained below.

The process 28A of FIG. 4C then transitions to step 142 which gets the coded data 42 "Ja*n" from the data buffer B of the field data segment 54B of FIG. 1B.

Then in step 144, for this example, a determination is made as to which type of artificial intelligence error correction process should be employed. This of course would depend upon the type of information contained in the respective field. For example, the first name field 16" contains first names and it would be appropriate to perform a lexical analysis of the similarity of the coded data 42 "Ja*n" with a lexicon of conventional first names. Alternately, if the field is for the abbreviation of state names, such as the field 12a", then it would be more suitable to apply a lexical analysis of the similarity of the character string 42' which is "FA" in FIG. 1G, of the third field data segment, to a lexical analysis of conventional state names and their abbreviations.

Accordingly, step 144 in FIG. 4C determines if the field name 68 for the field data segment 54B, is the "first name," and if it is, then the "first name" lexical process is executed. This occurs by transition to step 145 which compares the coded data with the list of common first names. Step 145 then transitions to step 148 where the lexical check is performed.

Alternately, if field name 68 is not "first name," but instead if step 146 determines that the field name 68 is "state," then step 146 executes the "state abbreviation" lexical procedure. This is done by transitioning to step 147 which compares the coded data with the list of state abbreviations. Step 147 then transitions to step 148 where the lexical check is performed.

Step 148 performs the lexical check of the coded data 42 "Ja*n" which includes the suspicious character 27 which is "a" and it computes a first certainty value using the selected lexical procedure. In this case the selected lexical procedure is the "first name" lexical procedure described above.

Then the process 28A of FIG. 4C transitions to step 149 which gets the second guess character 29, which in this case is the letter "o" shown in FIG. 1B, from the field data segment 54B, and it forms a second guess coded data 46, in this case "Joan."

Then the process 28A transitions to step 150 which does a lexical check of the second guess coded 46 and computes a second certainty value using the selected lexical procedure, which in this case is the "first name" lexical procedure.

Then in step 152, if the second certainty for the second guess coded data 46 is greater than the first certainty for the first guess coded data 42, then, in accordance with the invention, coded data 42 "Ja*n" is transferred from the data buffer B in the MGDS 50C of FIG. 1C and is placed in the input data repaired portion 37 of the first repair segment R1. This is followed by loading the second guess coded data 46 "Joan" into the data buffer B of the field data segment 54C shown in FIG. 1C. In this manner, the best estimate of the character string representing the field 16", is contained in the character data buffer B of the coded data portion 75 of the field data segment.

Then in step 154, the certainty 39 of the coded data 46 representation of the image in the field 16" is loaded into the first repair segment R1 as is shown in FIG. 1C. In this case, the certainty that the character string "Joan" represents the field 16" is 50 percent.

Then, process 28A transitions to step 156 which loads cluster data or alternate choices 48 for the coded data into the first repair segment R1. The artificial intelligence error correction processor 28 has determined that the alternate choice for the coded data representation of the field 16" is the character string "John" 48 and this is placed into the first repair segment R1, as is shown in FIG. 1C.

Then in step 158 the repair processor address "28" and the time stamp for the repair at the processor 28 are loaded into the first repair segment R1.

The process then transitions to step 160 which determines that another field data segment is present and if it is, then the process transitions to the start of the loop at step 140. In this case, the next field data segment in the MGDS 50B of FIG. 1G, is the field data segment 56B corresponding to the state field 12a". The artificial intelligence correction process 28A determines in step 146 that the field name 68 is "state" and it therefore executes the "state abbreviation" lexical process which results in a determination that the character string 46' which is "FL" is the more likely representation of the field 12a". Therefore step 152 transfers the coded data 42' which is "FA" into location 37 of the repair segment R1' of FIG. 1H, and it loads the second guess coded data 46' which is "FL" into the character data buffer B of the coded data portion 75" of the field data segment 56C of FIG. 1H. In this manner, the character string which is the most likely representation of the image for the state field 12a", is present in the character data buffer B of the coded data portion 75" of the field data segment.

When step 160 of process 28a determines that there are no more field data segments for analysis, then the process transitions to step 162 which outputs the MGDS message 50C shown in FIG. 1J(C). The MGDS message 50C shown in FIG. 1J(C) includes the six field data segments. In addition to the six field data segments, there are two repair segments, R1 which pertains to the second field for the first name and the repair segment R1' which pertains to the third field for the state. The first field data segment 52 has its buffer B unchanged from the MGDS 50B. The field data segment 54 for the MGDS 50C, has its buffer B changed to the new character string "Joan." The third state field segment 56 in MGDS 50C has its buffer B changed to the character string "FL." The fourth, fifth and sixth field segments 12b, 44 and 12 respectively, remain unchanged in MGDS 50C, over that in MGDS 50B. The additional repair segment R1 which repaired the first name field, has its buffer 37 containing the character string "Ja*n." The second repair segment R1' which repaired the state field, has its buffer 37 containing the string "FA." It is seen that a repair history is accumulating in the MGDS 50C in the form of the presence of the repair segments R1 and R1'. In addition, it is seen that the best estimate of the character string representing each respective field in the extracted field images 10" of FIG. 2D, is present in each respective character buffer B for each field data segment in the MGDS 50C.

In FIG. 1C, the MGDS message 50C is formed by the error correction processor 28, using information from the MGDS 50B received from the character recognition processor 26. The MGDS 50C of FIG. 1C will have the repair address for the processor 28 entered into the repair segment R1 which augments the MGDS 50B. The segment R1 also will have the ID of the repair namely artificial intelligence or "AI." Also included will be a repair time stamp which in this case is fifth hour, third minute, 58th second or the day. The operation done will be entered as "LEX," indicating that a lexical analysis has been performed for this first repair. Then, the field repaired encompassing parameter for the MGDS 50C of FIG. 1C, will include the field name which is "FIRST," character position which is the second character or as used herein, "1." In accordance with the invention, the first stage repair carried out at correction processor 28 makes use of first and second choice information included in the input MGDS message 50B from the character recognition processor 26.

It is appropriate at this point to discuss how the preferred embodiment of the invention uses a single intelligent forms processor 25 to execute in multi-task form, the respective processes carried out in the forms recognition and field extraction processor 24, the character recognition processor 26, and the artificial intelligence error correction processor 28.

FIG. 5A shows a detailed architectural diagram of the intelligent forms processor 25. The processor 25 includes a memory 302 which is connected by the bus 322 to the CPU 310, the bulk storage device 312, the display and keyboard 314, and the LAN adapter 316. The scanner adapter 318 connects the scanner 22 to the bus 322. The LAN adapter 316 connects the LAN 20 to the bus 322. In addition, an optional FAX and communications network adapter 320 can couple a fax telephone line to the bus 322 and can connect a data communications network to the bus 322. The CPU 310, can be for example an Intel 386 or 486 data processing unit. The bulk storage device 312 can be a hard disk storage such as a 200 megabyte hard disk storage, or it can be a combination of a hard disk magnetic storage and an optical read-write storage.

The memory 302 will include several computer programs, each of which is a sequence of executable instructions to carry out a process. The memory 302 includes a scanner interface program 23A' which carries out the processes performed by the scanner processor 23, as described above. Also included in the memory 302 is a partition for the buffer 40. Still further, a partition is provided in the memory 302 for the master form format 10F which is shown in FIG. 2A and in FIG. 2B.

The memory 302 provides a partition for the forms recognition program 24A' which carries out the forms recognition process 24A shown in FIG. 4A. The partition also includes the field extraction program 24B' which carries out the field extraction process 24B shown in FIG. 4A. The result of the execution of the forms recognition program 24A' and the field extraction program 24B' is the production of the extracted field images 10" and the production of the MGDS 50A, as has been described above.

Another partition is provided in the memory 302 for the character recognition program 26A' which carries out the character recognition process 26A shown in FIG. 4B. As a result of the execution of the character recognition program 26A', the MGDS 50B is produced. The character recognition program 26A' operates upon the MGDS 50A produced by the forms recognition program 24A' and the field extraction program 24B', to produce the MGDS 50B.

A partition is also provided in the memory 302 for the artificial intelligence error correction program 28A' which carries out the artificial intelligence process 28A shown in FIG. 4C. The artificial intelligence error correction program 28A' operates upon the MGDS 50B produced by the character recognition program 26A', to produce the MGDS 50C.

A multi-tasking operating system 304, such as IBM's Operating Systems/2, Extended Edition, can be used in multi-tasking mode to control the multi-task execution of the programs in the memory 302. Alternately, the operating system 304 need not oversee the multi-task execution of the application programs, but instead the application programs can be sequentially executed for processing a particular data field segment in the MGDS.

The provision of a facsimile and network adapter 320 connecting a telephone facsimile line to the processor 25, enables the receipt of facsimile images in lieu of images provided through the scanner adapter 318. Similarly, the connection of the adapter 320 to a data communications network enables the receipt of existing document image files from the network, in lieu of the production of such document image files by the scanner 22.

The MGDS message 50C is output from the AI error correction processor 28 over the local area network 20 to the second repair station which is the data base error correction processor 30. The data base error correction processor 30 contains a data base of customer names used in the particular application running on the host computer 34. The host computer 34, in this example, manages a document image archiving system for insurance forms, for an insurance company. The insurance company will have many insured customers and the list of those insured customers will be contained in the data base error correction processor 30. By comparing suggested character strings in the MGDS 50C which is input to the data base error correction processor 30, a selection can be made of that character string which is the same as the actual name of one of the insured customers in the particular host computer application. In this example, the MGDS 50C is input from the AI error correction processor 28 to the data base error correction processor 30 where there is appended thereto a second repair segment R2. The second repair segment R2 will characterize the second repair performed by the processor 30. In an alternate embodiment of the invention, the data base error correction processor 30 can be combined with the artificial intelligence error correction processor 28 and the character recognition processor 26 in the same processor 25 in a multi-task application.

The data base error correction processor 30 will take the preferred choice character string "Joan" 46 from the character data buffer B and will perform a comparison with the data base containing all of the insured customer names. It is found that there is no match for a "Joan Doe." Then, the data base error correction processor 30 takes the alternate choice 48 "John" received from the MGDS 50C, and applies it in a comparison of insured customer names in the data base. A successful comparison is made finding a "John Doe." As a result of this second repair operation, the contents of the character data buffer B with the string 46 "Joan," is transferred to the input data repair portion 37 in the second repair segment R2. Then, the contents of the character data buffer B is loaded with the repaired value for the character string 48 "John."

FIG. 4D illustrates the data base error correction process 30A which is performed by the data base error correction processor 30. The process begins with step 164 which inputs the MGDS message 50C shown in FIG. 1C. Then in step 166, a loop begins. The first field data segment 52C is accessed from the MGDS 50C, corresponding to the first field which is the last name field 14" and it is determined whether the suspicious character return code or the reject character return code has a non-zero value. Since the first field 14" has already been resolved satisfactorily, step 166 loops to get the next field data segment 54C.

Step 166 determines that the field data segment 54C which corresponds to the first name field 16", has a suspicious character return code equal to one and a reject character return code equal to one, as can be seen in FIG. 1C. Step 166 makes the further determination whether the first repair segment R1 has a certainty value 39 which is less than 100 percent. In the case of the field data segment 54C, its corresponding repair segment R1 has a certainty value of 50 percent and therefore it meets the criteria of step 166.

In step 168 of FIG. 4D, a second repair segment R2 is appended to the MGDS 50C, forming the MGDS message 50D shown in FIG. 1D. The second repair segment R2 will provide space for storing the history of repairs to be carried out by a data base error correction processor 30 on the character data in buffer B of the coded data portion 75 of the field data segment 54D, of FIG. 1D.

Then in step 170 of FIG. 4D, the coded data 46 which is the character string "Joan," is obtained from the data base buffer B in the field data segment 54C. Then in step 172, a data base check is performed of the coded data 46 "Joan," and a first certainty value is computed.

Then in step 174, the alternate choice coded data 48, which in this case is the character string "John," is obtained from the first repair segment R1, as is shown in FIG. 1C. Then in step 176, a data base check is performed of the alternate choice coded data 48 and a second certainty value is computed.

Then in step 178, if the second certainty value computed for the coded data 48 is greater than the first certainty value computed for the coded data 46, then the coded data 46 "Joan," in the data buffer B of the field data segment 54C, is transferred to the input data repair buffer 43 of the second repair segment R2 shown in FIG. 1D. Then, the alternate choice coded data 48 "John" is loaded into the character data buffer B as is shown in FIG. 1D. In this manner, the character string which has the best estimate of representing the image of the field 16", is present in the character data buffer B of the field data segment 54D in FIG. 1D.

Then the process of FIG. 4D transitions to step 180 which loads the certainty value 41 for the coded data 48 "John," into the second repair segment R2, as is shown in FIG. 1D. The data base error correction processor 30 has determined that the certainty is 100 percent for the coded data 48 "John."

Then the process transitions to step 184 to determine if there is another field data segment to be analyzed and if there is, then the process loops back to step 166.

Figure 1H:
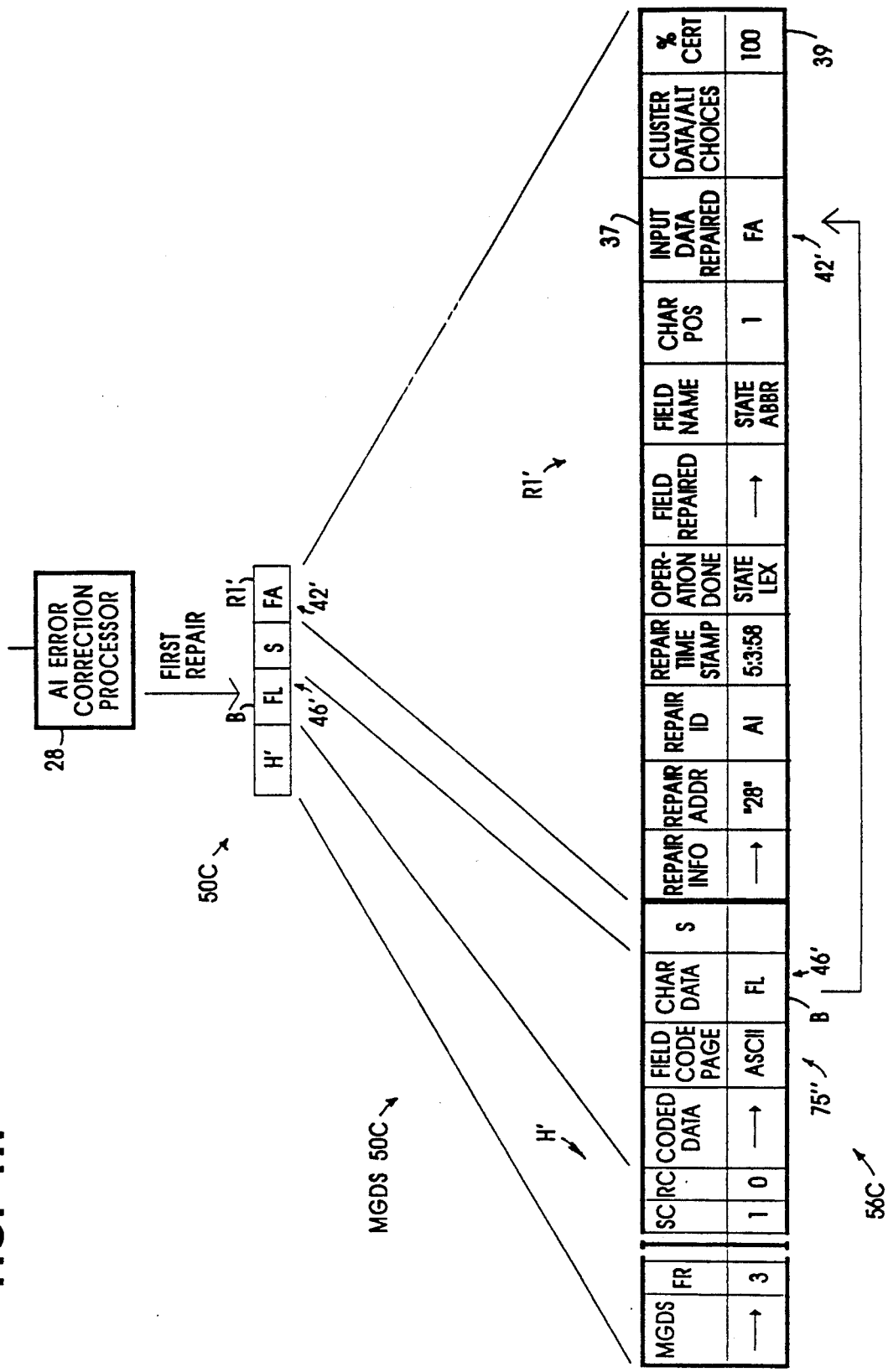
FIG. 1H illustrates the MGDS 50C after having generated the repair segment R1' for the third field data segment 56C.
Figure 11:
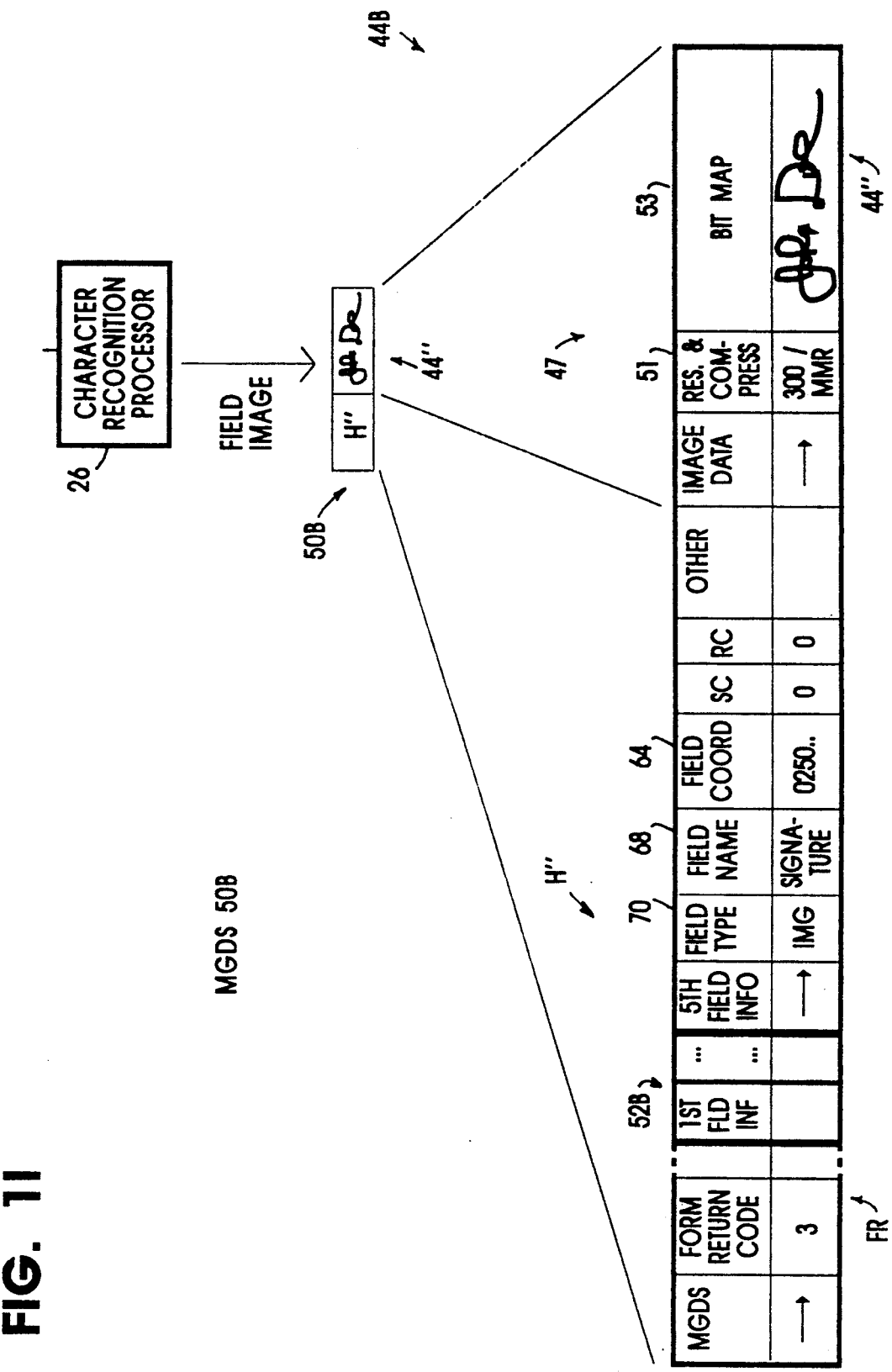
Figure 1L:
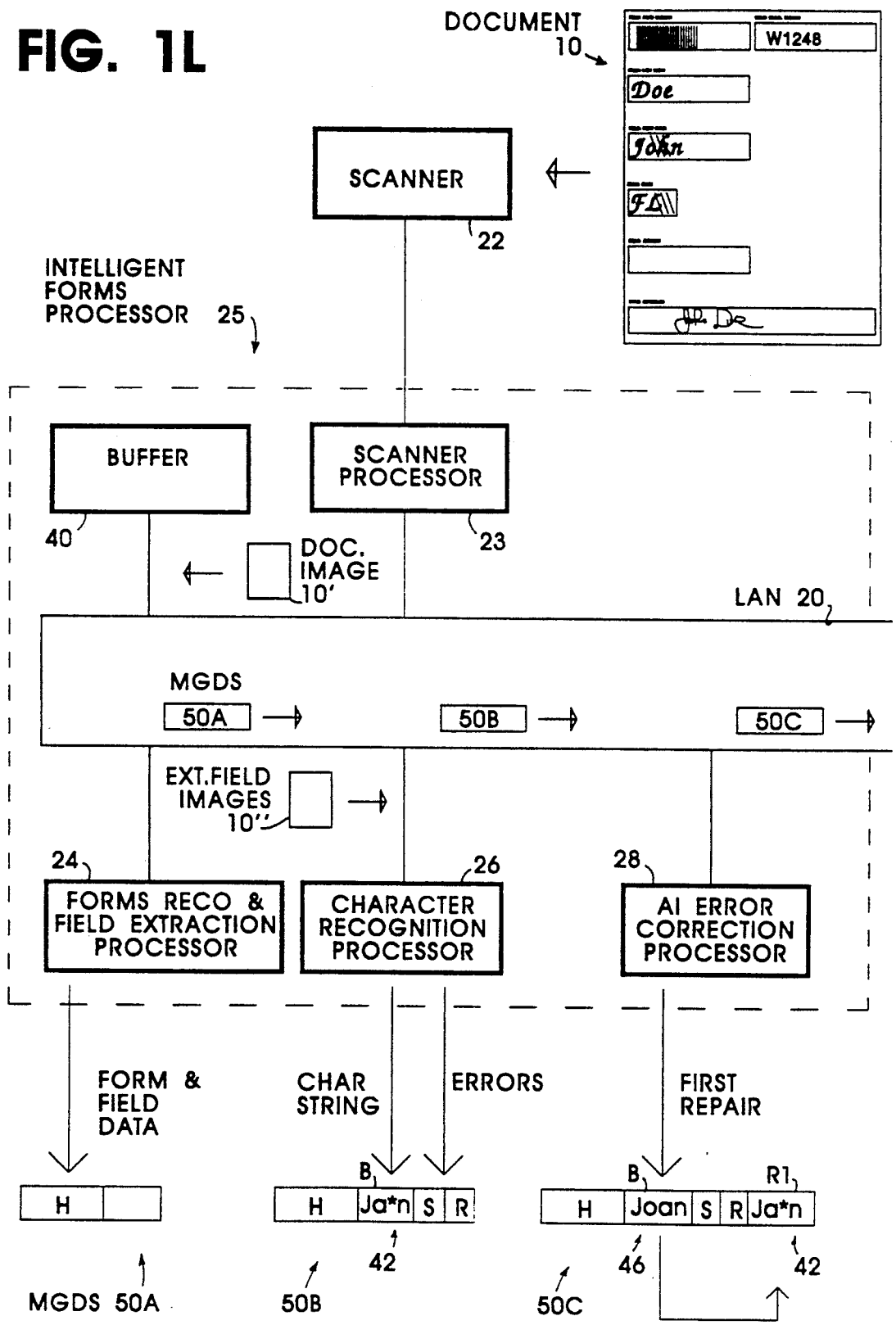
FIG. 1F illustrates the machine generated data structure (MGDS) 50A after having generated the third field data segment 56A.
FIG. 1I illustrates the MGDS 50B after having generated the fifth field data segment with the field image 44".
FIG. 1J(B) illustrates the MGDS 50B after the character recognition processor 26 has completed its operations on all six fields of the form.

In this example, the next field data segment is the third field data segment 56C shown in FIG. 1H. The corresponding repair segment R1' shows a 100 percent certainty 39 for the character string 46' which is "FL" for the state field. Therefore, step 166 determines that the criteria for further processing of this field data segment in the data base error correction process 38, is not fulfilled. Thus, the loop continues searching for additional field data segments to process in the process 38. Since, in this example, there are no further field data segments to process, step 184 transitions to step 186 which outputs the MGDS message 50D, which is shown in FIG. 1J(D).

The MGDS 50D shown in FIG. 1J(D) has six field data segments and three repair segments. The six field data segments correspond to the six fields present in the extracted field images 10" of FIG. 2D. The buffer B for each respective field data segment of the MGDS 50D contains the character string which is the best current estimate of the image of the characters in the corresponding field of the extracted field images 10". In addition, a character recognition repair history has been constructed in the form of the three repair segments R1, R1' and R2. The presence of these three repair segments assists in the subsequent further analysis of respective field data segments. The presence of these three repair segments also provides an audit trail for improving the overall character recognition process.

The error correction processor 30 loads the repair address "30" into the segment R2, it loads the repair ID which in this case is data base "DB" into second segment R2, and it loads the repair time stamp of the fifth hour, fourth minute, first second into the repair time stamp parameter of R2. The operation done is loaded as "DATA BASE" into the segment R2 and then their field repaired encompassing parameter in R2 has a field name of "FIRST" loaded therein, the character position of "2" is loaded indicating that the character which is changed is the third character in the string. The data base query can also be entered and is characterized as "customer name" in the segment R2. Also, the level of certainty of 100 percent can be entered into the segment R2. The completed MGDS message 50D output from the data base error correction processor 30 is shown in FIG. 1D.

The MGDS 50D is then transferred to the manual verify and correction processor 32 over the local area network 20.

The manual verify and correction processor 32 will accept the MGDS 50D and will append to it a third repair segment R3. Depending upon the application, a required manual verification can be made on the result of the sequential correction for the character string which has been flagged for the particular field.

The MGDS message 50D output from the data base error correction processor 30 and received by the manual verify and correction processor 32, contains the character data 48 "John" which is to be verified by the operator at the processor 30. The correction processor 32 will append a third repair segment R3 for the third repair stage, whether an actual repair or merely a validation takes place. The repair address "32" and the identity of the operator "Jones" will be entered into the segment R3. Also, the repair time stamp of fifth hour, fifth minute, 15th second, will be entered into the segment R3. The operation done will be indicated as "valid" for validate in segment R3. The coordinates for the character or the entire string as the application may require, are abstracted from the reject character information S originally produced by the character recognition processor 26. These are the coordinates of the location in the image bit map for the field and the reject or suspicious character identified by the character recognition processor 26. The correction processor 32 will use these coordinate values to highlight and/or magnifying the field as it is displayed to the operator. A copy of the document image 10' will be delivered over the LAN 20 to the correction processor 32, for viewing by the operator. The location specified by the coordinates of the rejected or suspicious character are used to highlight and/or magnify that portion of the document image displayed. The operator can then quickly compare the highlighted portion of the document image to the character string 48 "John," which is also displayed in alphanumeric characters on the display screen of the processor 32. If the operator accepts the representation of the string 48 "John," then a validation acceptance is recorded in the segment R3. The validation indication can be entered into the segment R3, for example under the comments portion.

Alternately, if the operator wishes to make a change such as capitalizing all of the characters to change string 48 into string 49 "JOHN," then in accordance with the invention, the string 48 is transferred from the character data buffer B to the input data repair portion 55 of the segment R3. Then the processor 32 loads the corrected value string 49 "JOHN" into the character data buffer B. Other appropriate fields are filled in the segment R3, such as the field name, character position, and comments.

The manual verify and correction process 32A is shown in FIGS. 4E and 4E'. The process beings in step 188 by inputting the MGDS message 50D shown in FIG. 1D. Then in step 190, a loop begins. Each field data segment in the MGDS 50D is examined to determine if the suspicious character return SC or the reject character return RC is non-zero and also whether there is a corresponding second repair segment R2 having a certainty 41 less than 100 percent. Also, other selection criteria can be applied in step 190, or alternately, the operator can request a particular MGDS corresponding to a particular form. In this example, the operator selects the second field 16' of the scanned form image 10' of FIG. 2C, for examination. This is the first name field and its corresponding field data segment 54D for the MGDS 50D of FIG. 1D will be operated upon by the process 32A of FIG. 4E.

The process then transitions to step 192 which appends a third repair segment R3 to the MGDS message 50D of FIG. 1D, forming the MGDS message 50E of FIG. 1E. The repair segment R3 will provide space for the recording of the history of repair steps taken by the manual verify and correction processor 32 on the character string 48 "John" in the buffer B of the coded data portion 75 of the data segment 54D of FIG. 1D.

The process then transitions to step 194 which gets the coded data 48 which is "John" from the buffer B of the field data segment 54D of FIG. 1D.

Then in step 196, the coded data 48 which is "John" is displayed to the repair operator. Then in step 198, the form document image 10' of FIG. 2C is accessed and is displayed to the repair operator.

Then in step 200, in accordance with the invention, the coordinates 21 of the suspicious character image and the coordinates 31 of the reject character image are obtained from the field data segment 54D. Then in step 202, the character images for the suspicious character and the reject character positions are highlighted and-/or magnified in the display to the repair operator. The field image 16' of FIG. 3 has the suspicious character position 21 highlighted and the rejected character position 31 highlighted to the repair operator.

In step 204, the operator may then input the corrected coded data 49 from the operator keyboard. In this case, the operator wishes to make the character string 48 "John" into an all capitals character string of 49 "JOHN."

Then, in step 206, in accordance with the invention, the coded data 48 is transferred from the data buffer B to the buffer 55 of the third repair segment R3 and the corrected coded data 49 is loaded into the buffer B, as is shown in FIG. 1E. In this manner, the best estimate of the character string which represents the image in the field 16' of the form image 10' of FIG. 2C, will reside in the character data buffer B at the coded data portion 75 of the field data segment 54E of the MGDS 50E, as shown in FIG. 1E.

Then in step 208, the operator may load comments into the third repair segment R3. Then step 210 loads the repair processor address and time stamp into the third repair segment R3.

Step 212 of process 32A determines if there is another field to process. In this example, the repair operator at the manual verify and correction processor 32 wishes to make an alteration to the character string 46' which is "FL" in FIG. 1H. The operator wishes to make the change to the three character abbreviation "Fla." This is shown in the third field data segment 56 of FIG. 1J(E), where buffer B now contains the character string "Fla." Correspondingly, an additional repair segment R3' has been added to the MGDS 50E in which the buffer 55 contains the character data 46' which is "FL" which was taken from the buffer B in FIG. 1H.

In this example, there will be no other fields to process by the manual verify and correction process 32A. Thus the process transitions to step 214 which outputs the MGDS message 50E, shown in FIG. 1J(E). The MGDS message 50E shown in FIG. 1J(E) has six field data segments and five repair segments.

FIG. 1J(E) shows the form of the MGDS 50E which will be output to the host computer 34 for storage in the repair history storage 38. Before storing the MGDS 50E in the repair history storage 38, the host computer 34 will take the contents of the buffer B for each field data segment for each of the six fields of the form 10' of FIG. 2C, and it will store the contents of each buffer B as the best estimate of the character string which represents the image of the corresponding field in the form. The coded data from field segment 52 for the MGDS 50E is contained in its buffer B as "Doe." This coded data is stored in the coded data storage 35 by the host computer 34, as representing the last name field 16' of the scanned form image 10' in FIG. 2C. Similarly, the buffer B for the field data segment 54 containing the character string "JOHN" will be stored by the host computer 34 in the coded data storage 35 as the best estimate of the character string representing the first name field 16' of the scanned form image 10'. Similarly, the contents of the buffer B for the field data segment 56 which is the character string "Fla." will be stored in the coded data storage 35 by the host computer 34, as the best estimate of the state field 12a' of the scanned form image 10' of FIG. 2C.

At a later time, if the host computer 34 is instructed to conduct an audit as to how the character string in buffer B for a particular field data segment in the MGDS 50E was repaired, the history of repairs for the character recognition of that field can be ascertained by accessing the MGDS 50E from the repair history storage 38. Each respective repair segment corresponding to the field being audited, can be examined to determine how the repair was carried out. For example, for the second field segment 54 which represents the first name field 16', an audit of the character recognition repairs would examine the field data segment 54, the repair segment R3, the repair segment R2, and the repair segment R1, in that sequential order. This would enable working backwards from the final best estimate of the field contained in the field data segment 54 of the MGDS 50E, backward in reverse sequence for the repairs that were executed on that field. If such an audit were conducted in order to improve the overall repair process, a clear indication as to how each stage of the repair was conducted would be revealed from the collective repair history represented by the repair segments in the MGDS 50E.

The resulting MGDS message 50E now contains a history of the sequential repairs performed on the contents of the first name field 16. The MGDS message 50E can then be transmitted over the LAN 20 to the buffer storage 40' for temporary storage. Alternately it can be transferred to the repair history storage 38 for long term storage. Alternately, it can be transferred to the host computer 34 where the contents of the coded data buffer B for the field data segment 54, which is the string 49, can be loaded into the coded data storage 35. The contents can be used for example as an index value where the application uses the insured customer name as the index value to store the document image 10'.

Figure 5B:
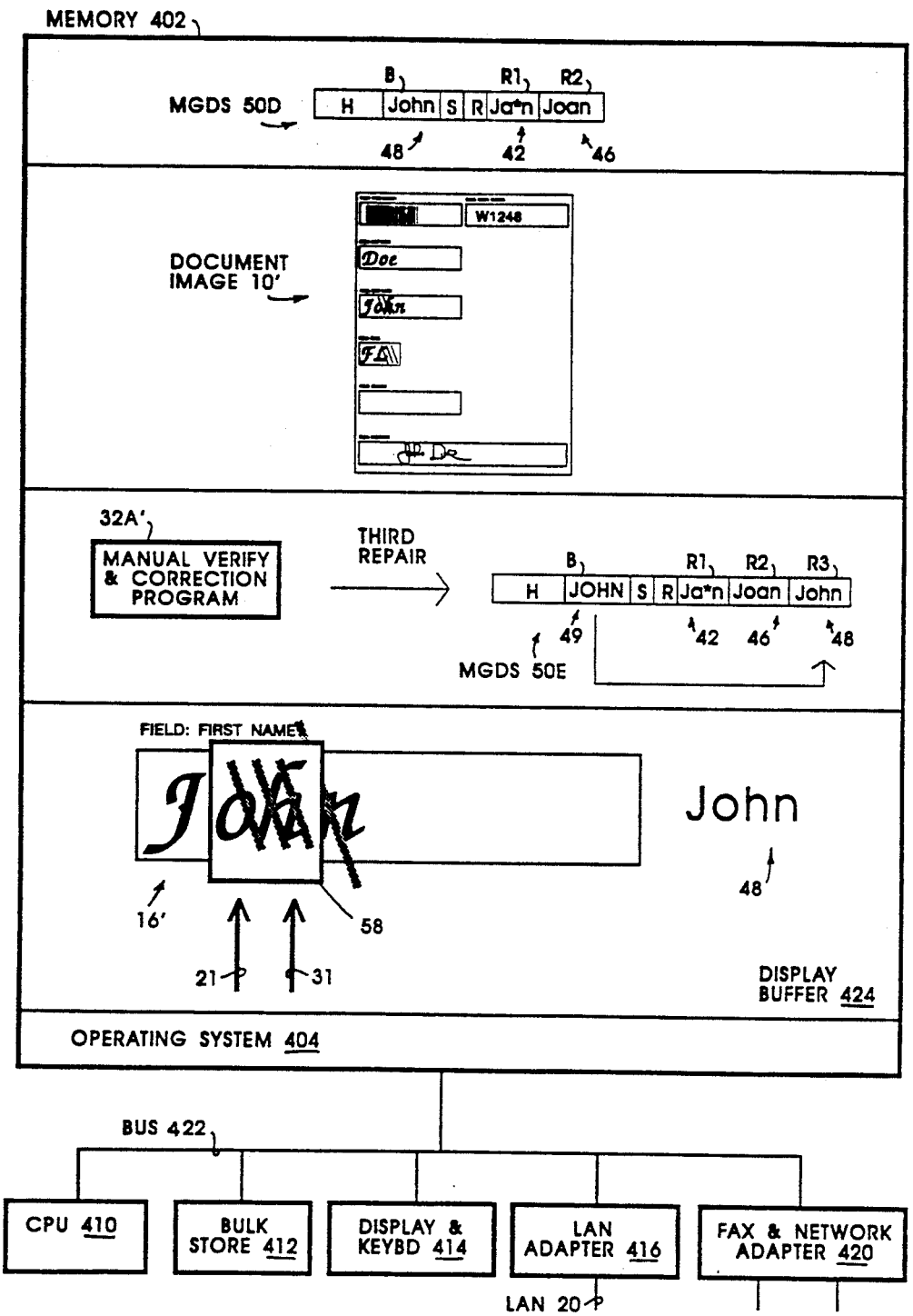
FIG. 5B illustrates a detailed architectural diagram of the manual verify and correction processor 32.

The manual verify and correction processor 32 is shown in a more detailed architectural diagram in FIG. 5B. The processor 32 consists of a memory 402 connected by the bus 422 to CPU 410, a bulk storage device 412, a display and keyboard 414, a LAN adapter 416, and a facsimile and network adapter 420. The LAN adapter 416 connects the LAN 20 to the bus 422. The FAX and network adapter 420 connects a facsimile telephone line to the bus 422 and it connects a data communications network line to the bus 422.

The memory 402 of the processor 32 contains several partitions which include computer programs which are sequences of executable instructions to carry out the processes described above. In particular, the manual verify and correction program 32A' is stored in the memory 402, and when its instructions are executed by the CPU 410, it carries out the manual verify and correction process 32A of FIG. 4E.

The memory 402 also includes a partition for receiving and storing the MGDS 50D shown in greater detail in FIG. 1D. The memory 402 also has a partition for receiving and storing the form document image 10'.

The memory 402 also has a display buffer partition 424 where the form document image 10' is assembled with a highlighted region 58 which is superimposed on the field image 16' at the suspicious character position 21 and the rejected character position 31. This composite image is then displayed to the operator at the processor 32. In addition, the display buffer will assemble the coded data 48 which is "John" so that it may be also displayed to the operator, as previously described. The coded data 48 is obtained from the character data buffer B of the coded data portion 75 of the MGDS 50D. The display buffer 424 in the memory 402 has it contents displayed on a display device 414. The operator will enter the alternate character string 49 which is "JOHN" at the keyboard.

The resulting invention enables the best estimate of the information content of the document filed to be readily available for the next stage of character repair or for use. At each stage of repair, the best alternate trial strings and second guess character are also readily available for each category filed of the next stage of repair. The invention enables the performance of the recognition process to be maximized, since the level of certainty of the trial string resulting form the previous repair stages is readily available for the next stage of repair. This enables the avoidance of subsequent attempts at further repair for those files that have a certainty value. And finally, the invention enables the auditing of the overall recognition process, since the history of repair for each category field is readily available.

Although a specific embodiment of the invention has been disclosed, it will be understood by those having skill in the art that changes can be made to that specific embodiment without departing from the spirit and the scope of the invention.

What is claimed is:

1. In a data processing system, a method for repairing character recognition errors for digital images of document forms, comprising:

inputting a digital document image of a document form and extracting a field image from said document image, forming a corresponding extracted field image;

generating recognition coded data from said extracted field image and generating recognition error data using a character recognition process;

assembling a machine generated data structure (MGDS) which includes a field data segment including a coded data buffer portion and an error buffer portion for said extracted field image;

inserting said recognition coded data into said coded data buffer portion and inserting said recognition error data into said error buffer portion of said field data segment;

transferring said MGDS to a coded data repair process, for repairing said recognition coded data;

augmenting said MGDS with a repair segment which includes a repair data buffer portion;

accessing said recognition coded data from said coded data buffer portion and accessing said recognition error data from said error buffer portion of said field data segment and generating repaired coded data using said repair process;

inserting said repaired coded data into said coded data buffer portion of said field data segment and inserting said recognition coded data into said repair data buffer portion of said repair segment; and transferring said MGDS to a utilization device and accessing the contents of said coded data buffer portion of said field data segment for use as a corrected form of said recognition coded data.

2. In a data processing system, a method for repairing character recognition errors for digital images of document forms, comprising:

inputting a digital document image of a document form and extracting a field image from said document image, forming a corresponding extracted field image;

generating recognition coded data from said extracted field image and generating recognition error data using a character recognition process;

assembling a machine generated data structure (MGDS) which includes a field data segment including a coded data buffer portion and an error buffer portion for said extracted field image;

inserting said recognition coded data into said coded data buffer portion and inserting said recognition error data into said error buffer portion of said field data segment;

transferring said MGDS to a first coded data repair process, for repairing said recognition coded data;

augmenting said MGDS with a first repair segment which includes a first repair data buffer portion;

accessing said recognition coded data from said coded data buffer portion and accessing said recognition error data from said error buffer portion of said field data segment and generating first repaired coded data using said first repair process;

inserting said first repaired coded data into said coded data buffer portion of said field data segment and inserting said recognition coded data into said first repair data buffer portion of said first repair segment;

transferring said MGDS to a second coded data repair process, for repairing said first repaired coded data;

augmenting said MGDS with a second repair segment which includes a second repair data buffer portion;

accessing said first repaired coded data from said coded data buffer portion of said field data segment and generating second repaired coded data using said second repair process;

inserting said second repaired coded data into said coded data buffer portion of said field data segment and inserting said first repaired coded data into said second repair data buffer portion of said second repair segment; and transferring said MGDS to a utilization device and accessing the contents of said coded data buffer portion of said field data segment for use as a corrected form of said recognition coded data.

3. In a data processing system, a method for repairing character recognition errors for digital images of document forms, comprising:

inputting a digital document image of a document form and extracting a field image from said document image, forming a corresponding extracted field image;

generating recognition coded data from said extracted field image and generating recognition error data using a character recognition process;

assembling a machine generated data structure (MGDS) which includes a field data segment including a coded data buffer portion and an error buffer portion for said extracted field image;

inserting said recognition coded data into said coded data buffer portion and inserting said recognition error data into said error buffer portion of said field data segment;

transferring said MGDS to a first coded data repair process, for repairing said recognition coded data;

augmenting said MGDS with a first repair segment which includes a first repair data buffer portion and an alternate data buffer portion;

accessing said recognition coded data from said coded data buffer portion and accessing said recognition error data from said error buffer portion of said field data segment and generating first repaired coded data and alternate coded data using said first repair process;

inserting said first repaired coded data into said coded data buffer portion of said field data segment, inserting said recognition coded data into said first repair data buffer portion of said first repair segment and inserting said alternate coded data into said alternate data buffer portion of said first repair segment;

transferring said MGDS to a second coded data repair process, for repairing said first repaired coded data;

augmenting said MGDS with a second repair segment which includes a second repair data buffer portion; accessing said first repaired coded data from said coded data buffer portion of said field data segment, accessing said alternate coded data from said alternate data buffer portion of said first repair segment and generating second repaired coded data using said second repair process;

inserting said second repaired coded data into said coded data buffer portion of said field data segment and inserting said first repaired coded data into said second repair data buffer portion of said second repair segment; and transferring said MGDS to a utilization device and accessing the contents of said coded data buffer portion of said field data segment for use as a corrected form of said recognition coded data.

4. In a data processing system, a method for repairing character recognition errors for digital images of document forms, comprising:

inputting a digital document image of a document form and extracting a field image from said document image, forming a corresponding extracted field image;

generating recognition coded data from said extracted field image and generating recognition error data using a character recognition process, said recognition error data including error location information;

assembling a machine generated data structure (MGDS) which includes a field data segment including a coded data buffer portion and an error buffer portion for said extracted field image;

inserting said recognition coded data into said coded data buffer portion and inserting said recognition error data into said error buffer portion of said field data segment;

transferring said MGDS to a coded data repair process, for repairing said recognition coded data;

augmenting said MGDS with a repair segment which includes a repair data buffer portion;

accessing said recognition coded data from said coded data buffer portion and accessing said recognition error data from said error buffer portion of said field data segment and generating repaired coded data using said repair process;

inserting said repaired coded data into said coded data buffer portion of said field data segment and inserting said recognition coded data into said repair data buffer portion of said repair segment;

transferring said MGDS and said digital document image to a workstation display device;

accessing the contents of said coded data buffer portion of said field data segment and displaying it at said workstation as a corrected form of said recognition coded data; and accessing said error location information from said error buffer portion of said field data segment, displaying said digital document image at said workstation and highlighting a displayed portion of said field identified by said error location information.

5. In a data processing system, a method for repairing character recognition errors for digital images of document forms, comprising:

inputting a digital document image of a document form and extracting a field image from said document image, forming a corresponding extracted field image;

generating recognition coded data from said extracted field image and generating recognition error data using a character recognition process, said recognition error data including error location information;

assembling a machine generated data structure (MGDS) which includes a field data segment including a coded data buffer portion and an error buffer portion for said extracted field image;

inserting said recognition coded data into said coded data buffer portion and inserting said recognition error data into said error buffer portion of said field data segment;

transferring said MGDS and said digital document image to a workstation display device, for repairing said recognition coded data;

augmenting said MGDS with a repair segment which includes a repair data buffer portion;

accessing the contents of said coded data buffer portion of said field data segment and displaying it at said workstation as said recognition coded data;

accessing said error location information from said error buffer portion of said field data segment, displaying said digital document image at said workstation and highlighting a displayed portion of said field identified by said error location information;

generating repaired coded data at said workstation;

inserting said repaired coded data into said coded data buffer portion of said field data segment and inserting said recognition coded data into said repair data buffer portion of said repair segment;

transferring said MGDS to a utilization device and accessing the contents of said coded data buffer portion of said field data segment for use as a corrected form of said recognition coded data.

6. In a data processing system, a method for repairing character recognition errors for digital images of document forms, comprising:

inputting a digital document image of a document form and extracting a field image from said document image, forming a corresponding extracted field image;

generating recognition coded data from said extracted field image and generating recognition error data using a character recognition process, said recognition error data including error location information;

assembling a machine generated data structure (MGDS) which includes a field data segment including a coded data buffer portion and an error buffer portion for said extracted field image;

inserting said recognition coded data into said coded data buffer portion and inserting said recognition error data into said error buffer portion of said field data segment;

transferring said MGDS to a first coded data repair process, for repairing said recognition coded data;

augmenting said MGDS with a first repair segment which includes a first repair data buffer portion;

processing said recognition coded data from said coded data buffer portion and accessing said recognition error data from said error buffer portion of said field data segment and generating first repaired coded data using said first repair process;

inserting said first repaired coded data into said coded data buffer portion of said field data segment and inserting said recognition coded data into said first repair data buffer portion of said first repair segment;

transferring said MGDS and said digital document image to a workstation display device, for repairing said first repaired coded data;

augmenting said MGDS with a second repair segment which includes a second repair data buffer portion;

accessing said first repaired coded data from said coded data buffer portion of said field data segment and displaying it at said workstation;

accessing said error location information from said error buffer portion of said field data segment, displaying said digital document image at said workstation and highlighting a displayed portion of said field identified by said error location information;

generating second repaired coded data at said workstation;

inserting said second repaired coded data into said coded data buffer portion of said field data segment and inserting said first repaired coded data into said second repair data buffer portion of said second repair segment;

transferring said MGDS to a utilization device and accessing the contents of said coded data buffer portion of said field data segment for use as a corrected form of said recognition coded data.

7. In a data processing system, a method for repairing character recognition errors for digital images of document forms, comprising:

inputting a digital document image of a document form and extracting a field image from said document image, forming a corresponding extracted field image;

generating recognition coded data from said extracted field image and generating recognition error data using a character recognition process;

assembling a machine generated data structure (MGDS) which includes a field data segment including a coded data buffer portion and an error buffer portion for said extracted field image;

inserting said recognition coded data into said coded data buffer portion and inserting said recognition error data into said error buffer portion of said field data segment;

transferring said MGDS to a first coded data repair process, for repairing said recognition coded data;

augmenting said MGDS with a first repair segment which includes a first repair data buffer portion and a repair certainty buffer portion;

accessing said recognition coded data from said coded data buffer portion and accessing said recognition error data from said error buffer portion of said field data segment and generating first repaired coded data and generating a repair certainty value using said first repair process;

inserting said first repaired coded data into said coded data buffer portion of said field data segment and inserting said recognition coded data into said first repair data buffer portion of said first repair segment and inserting said repair certainty value into said repair certainty buffer portion of said first repair segment;

transferring said MGDS to a second coded data repair process, for selectively repairing said first repaired coded data;

accessing said repair certainty value from said first repair segment and in response thereto, selectively augmenting said MGDS with a second repair segment which includes a second repair data buffer portion;

selectively accessing in response to said repair certainty value, said first repaired coded data from said coded data buffer portion of said field data segment and generating second repaired coded data using said second repair process;

selectively inserting in response to said repair certainty value, said second repaired coded data into said coded data buffer portion of said field data segment and inserting said first repaired coded data into said second repair data buffer portion of said second repair segment; and transferring said MGDS to a utilization device and accessing the contents of said coded data buffer portion of said field data segment for use as a corrected form of said recognition coded data.

8. In a data processing system, a computer program which, when executed in the data processing system, performs a method for repairing character recognition errors for digital images of document forms, the method comprising the steps of:

inputting a digital document image of a document form and extracting a field image from said document image, forming a corresponding extracted field image;

generating recognition coded data from said extracted field image and generating recognition error data using a character recognition process;

assembling a machine generated data structure (MGDS) which includes a field data segment including a coded data buffer portion and an error buffer portion for said extracted field image;

inserting said recognition coded data into said coded data buffer portion and inserting said recognition error data into said error buffer portion of said field data segment;

transferring said MGDS to a coded data repair process, for repairing said recognition coded data;

augmenting said MGDS with a repair segment which includes a repair data buffer portion;

accessing said recognition coded data from said coded data buffer portion and accessing said recognition error data from said error buffer portion of said field data segment and generating repaired coded data using said repair process;

inserting said repaired coded data into said coded data buffer portion of said field data segment and inserting said recognition coded data into said repair data buffer portion of said repair segment; and transferring said MGDS to a utilization device and accessing the contents of said coded data buffer portion of said field data segment for use as a corrected form of said recognition coded data.

9. A data processing system for repairing character recognition errors for digital images of document forms, comprising:

an intelligent forms processor, for inputting a digital document image of a document form and extracting a field image from said document image, forming a corresponding extracted field image;

said intelligent forms processor generating recognition coded data from said extracted field image and generating recognition error data using a character recognition process;

said intelligent forms processor assembling a machine generated data structure (MGDS) which includes a field data segment including a coded data buffer portion and an error buffer portion for said extracted field image;

said intelligent forms processor inserting said recognition coded data into said coded data buffer portion and inserting said recognition error data into said error buffer portion of said field data segment;

a first coded data repair processor coupled to said intelligent forms processor, for receiving said MGDS and repairing said recognition coded data;

said first coded data repair processor augmenting said MGDS with a first repair segment which includes a first repair data buffer portion;

said first coded data repair processor accessing said recognition coded data from said coded data buffer portion and accessing said recognition error data from said error buffer portion of said field data segment and generating first repaired coded data using said first repair process;

said first coded data repair processor inserting said first repaired coded data into said coded data buffer portion of said field data segment and inserting said recognition coded data into said first repair data buffer portion of said first repair segment;

a utilization processor coupled to said first coded data repair processor, for receiving said MGDS and accessing the contents of said coded data buffer portion of said field data segment for use as a corrected form of said recognition coded data.

10. The data processing system of claim 9, which further comprises:

a second coded data repair processor coupled to said first coded data processor, for receiving said MGDS and repairing said first repaired coded data;

said second coded data repair processor augmenting said MGDS with a second repair segment which includes a second repair data buffer portion;

said second coded data repair processor accessing said first repaired coded data from said coded data buffer portion of said field data segment and generating second repaired coded data using said second repair process;

said second coded data repair processor inserting said second repaired coded data into said coded data buffer portion of said field data segment and inserting said first repaired coded data into said second repair data buffer portion of said second repair segment; and said utilization processor coupled to said second coded data repair processor, for receiving said MGDS and accessing the contents of said coded data buffer portion of said field data segment for use as a corrected form of said recognition coded data.

* * * * *